US012629658B2

(12) United States Patent
Woo et al.

(10) Patent No.: US 12,629,658 B2
(45) Date of Patent: May 19, 2026

(54) SUPER ABSORBENT POLYMER

(71) Applicant: LG Chem, Ltd., Seoul (KR)

(72) Inventors: Heechang Woo, Daejeon (KR); Sung Soo Park, Daejeon (KR); Junwye Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/894,676

(22) Filed: Sep. 24, 2024

(65) Prior Publication Data

US 2025/0262608 A1 Aug. 21, 2025

(30) Foreign Application Priority Data

Feb. 19, 2024 (KR) ........................ 10-2024-0023680

(51) Int. Cl.
*B01J 20/26* (2006.01)

(52) U.S. Cl.
CPC .......... *B01J 20/261* (2013.01); *B01J 2220/68* (2013.01)

(58) Field of Classification Search
None
See application file for complete search history.

(56) References Cited

U.S. PATENT DOCUMENTS 5,338,766 A 8/1994 Phan et al.
6,319,558 B1 11/2001 Willemsen
10,994,260 B2 5/2021 Kovacic et al.
2005/0003191 A1 1/2005 Ehrnsperger et al.
2005/0239942 A1 10/2005 Herfert et al.
2006/0020053 A1 1/2006 Flohr et al.
2007/0264489 A1 11/2007 Sasabe et al.
2008/0021150 A1 1/2008 Becker et al.
2008/0075937 A1 3/2008 Wada et al.
2008/0140037 A1 6/2008 Newman
2010/0216938 A1 8/2010 Becker et al.
2012/0220452 A1 8/2012 Matsumoto et al.
2013/0026412 A1 1/2013 Machida et al.
2013/0102750 A1 4/2013 Watanabe et al.
2013/0136713 A1 5/2013 Terada et al.
2013/0175473 A1 7/2013 Wada et al.
2014/0031203 A1 1/2014 Kondo et al.
2014/0031473 A1 1/2014 Nogi et al.
2015/0299404 A1 10/2015 Daniel et al.
(Continued)

FOREIGN PATENT DOCUMENTS

CA 2319786 A1 8/1999
CN 001136355 C 1/2004
(Continued)

OTHER PUBLICATIONS

Zhang, S. et al., "Predicting the Swelling Behavior of Acrylic Superabsorbent Polymers Used in Diapers," Advances in Polymer Technology, Dec. 2021, pp. 1-7.
(Continued)

*Primary Examiner* — Daniel Berns
(74) *Attorney, Agent, or Firm* — Lerner David LLP

(57) ABSTRACT

The present disclosure herein relates to a super absorbent polymer, and more particularly, to a super absorbent polymer exhibiting excellent absorption behavior with respect to water having a low ion concentration and a low electrical conductivity, and particularly, having quick initial absorption speed, and a large maximum absorption capacity.

11 Claims, 4 Drawing Sheets

(56) References Cited

U.S. PATENT DOCUMENTS

| | | | |
|---|---|---|---|
| 2015/0307681 | A1 | 10/2015 | Park et al. |
| 2015/0322180 | A1 | 11/2015 | Matsumoto et al. |
| 2016/0208035 | A1 | 7/2016 | Ryu et al. |
| 2017/0014801 | A1 | 1/2017 | Ikeuchi et al. |
| 2017/0073478 | A1 | 3/2017 | Joo et al. |
| 2017/0189575 | A1 | 7/2017 | Lee et al. |
| 2017/0216817 | A1 | 8/2017 | Torii et al. |
| 2017/0233534 | A1 | 8/2017 | Kim et al. |
| 2017/0312148 | A1 | 11/2017 | Dobrosielska-Oura et al. |
| 2018/0021437 | A1 | 1/2018 | Kim et al. |
| 2018/0037686 | A1 | 2/2018 | Lee et al. |
| 2018/0243464 | A1 | 8/2018 | Hwang et al. |
| 2019/0099739 | A1 | 4/2019 | Lee et al. |
| 2019/0308171 | A1 | 10/2019 | Kim et al. |
| 2019/0344243 | A1 | 11/2019 | Lee et al. |
| 2020/0085716 | A1 | 3/2020 | Mehling et al. |
| 2020/0139344 | A1* | 5/2020 | Kim ........................ B01J 20/261 |
| 2020/0247958 | A1 | 8/2020 | Park et al. |
| 2021/0033516 | A1 | 2/2021 | Toennessen et al. |
| 2021/0040271 | A1 | 2/2021 | Lee et al. |
| 2021/0100684 | A1 | 4/2021 | Kitabata et al. |
| 2021/0113989 | A1 | 4/2021 | Hur et al. |
| 2021/0121852 | A1 | 4/2021 | Herfert et al. |
| 2021/0154637 | A1 | 5/2021 | Pfeiffer et al. |
| 2021/0244844 | A1 | 8/2021 | Chan et al. |
| 2021/0309777 | A1 | 10/2021 | Lee et al. |
| 2021/0362126 | A1 | 11/2021 | Bauer et al. |
| 2022/0088568 | A1 | 3/2022 | Kimura et al. |
| 2022/0184579 | A1 | 6/2022 | Yan et al. |
| 2023/0102961 | A1 | 3/2023 | Nishimura et al. |
| 2023/0330629 | A1 | 10/2023 | Won et al. |
| 2023/0338925 | A1 | 10/2023 | Chung et al. |
| 2023/0347317 | A1 | 11/2023 | Yoon et al. |
| 2023/0374232 | A1 | 11/2023 | Ryu et al. |
| 2023/0381744 | A1 | 11/2023 | Woo et al. |
| 2024/0238759 | A1 | 7/2024 | Ryu et al. |
| 2024/0261762 | A1 | 8/2024 | Kim et al. |
| 2024/0278210 | A1 | 8/2024 | Lee et al. |
| 2024/0278211 | A1 | 8/2024 | Han et al. |
| 2024/0351003 | A1 | 10/2024 | Nam et al. |

FOREIGN PATENT DOCUMENTS

| | | | |
|---|---|---|---|
| EP | 1024176 | A1 | 8/2000 |
| EP | 3270857 | B1 | 12/2019 |
| EP | 4137534 | A1 | 2/2023 |
| EP | 4206244 | A1 | 7/2023 |
| EP | 4253451 | A1 | 10/2023 |
| EP | 4321559 | A1 | 2/2024 |
| EP | 4321561 | A1 | 2/2024 |
| JP | H8122284 | A | 5/1996 |
| JP | 2001106728 | A | 4/2001 |
| JP | 2002504568 | A | 2/2002 |
| JP | 2005097569 | A | 4/2005 |
| JP | 3745539 | B2 | 2/2006 |
| JP | 2006527641 | A | 12/2006 |
| JP | 2007512405 | A | 5/2007 |
| JP | 2009057496 | A | 3/2009 |
| JP | 4261853 | B2 | 4/2009 |
| JP | 4284767 | B2 | 6/2009 |
| JP | 4908545 | B2 | 4/2012 |
| JP | 2012097273 | A | 5/2012 |
| JP | WO 2012144564 | A1 | 7/2014 |
| JP | 5616437 | B2 | 10/2014 |
| JP | 5692844 | B2 | 4/2015 |
| JP | 2015120933 | A | 7/2015 |
| JP | 5913423 | B2 | 4/2016 |
| JP | 2017185485 | A | 10/2017 |
| JP | 2017531531 | A | 10/2017 |
| JP | 2018510041 | A | 4/2018 |
| JP | 2021510320 | A | 4/2021 |
| JP | 6890190 | B2 | 6/2021 |
| JP | 6950158 | B2 | 10/2021 |
| JP | 6959030 | B2 | 11/2021 |
| JP | 7181948 | B2 | 12/2022 |
| JP | 7270828 | B2 | 5/2023 |
| JP | 7362653 | B2 | 10/2023 |
| KR | 100317398 | B1 | 11/2002 |
| KR | 20050036974 | A | 4/2005 |
| KR | 20070039050 | A | 4/2007 |
| KR | 20070048226 | A | 5/2007 |
| KR | 20070083761 | A | 8/2007 |
| KR | 20130097771 | A | 9/2013 |
| KR | 20140063116 | A | 5/2014 |
| KR | 2015-0062959 | A | 6/2015 |
| KR | 20150087368 | A | 7/2015 |
| KR | 20150142636 | A | 12/2015 |
| KR | 20150143181 | A | 12/2015 |
| KR | 20160127742 | A | 11/2016 |
| KR | 101700354 | B1 | 1/2017 |
| KR | 20170020113 | A | 2/2017 |
| KR | 20170033634 | A | 3/2017 |
| KR | 20170063818 | A | 6/2017 |
| KR | 20170111295 | A | 10/2017 |
| KR | 101812895 | B1 | 12/2017 |
| KR | 20180073334 | A | 7/2018 |
| KR | 20180074384 | A | 7/2018 |
| KR | 101908142 | B1 | 10/2018 |
| KR | 101918647 | B1 | 11/2018 |
| KR | 20190012809 | A | 2/2019 |
| KR | 20190016534 | A | 2/2019 |
| KR | 101989142 | B1 | 6/2019 |
| KR | 20190072406 | A | 6/2019 |
| KR | 102094453 | B1 | 3/2020 |
| KR | 20200051565 | A | 5/2020 |
| KR | 20200062012 | A | 6/2020 |
| KR | 20200073044 | A | 6/2020 |
| KR | 20200123127 | A | 10/2020 |
| KR | 102322774 | B1 | 11/2021 |
| KR | 20220046497 | A | 4/2022 |
| KR | 20220049961 | A | 4/2022 |
| KR | 20220068184 | A | 5/2022 |
| KR | 20220088351 | A | 6/2022 |
| KR | 20220169431 | A | 12/2022 |
| KR | 20220169437 | A | 12/2022 |
| KR | 20220169444 | A | 12/2022 |
| KR | 102568226 | B1 | 8/2023 |
| KR | 20230120110 | A | 8/2023 |
| KR | 102578740 | B1 | 9/2023 |
| KR | 102584470 | B1 | 10/2023 |
| KR | 20240014710 | A | 2/2024 |
| WO | 2022108430 | A1 | 5/2022 |
| WO | 2022131838 | A1 | 6/2022 |
| WO | 2022265459 | A1 | 12/2022 |
| WO | 2022265466 | A1 | 12/2022 |
| WO | 2022265472 | A1 | 12/2022 |
| WO | 2022265473 | A1 | 12/2022 |
| WO | 2022265477 | A1 | 12/2022 |

OTHER PUBLICATIONS

Shi, M, et al., "The Development of a Polysaccharide-Based Hydrogel Encapsulating Tobramycin-Loaded Gelatine Microspheres as an Antibacterial System," Gels, MDPI, Mar. 2023, pp. 1-15, vol. 9, No. 219.

International Search Report for Application No. PCT/KR2024/018688 mailed Mar. 7, 2025. 5 pages (see p. 2-4, categorizing the cited references).

International Search Report for Application No. PCT/KR2024/018689 mailed Mar. 7, 2025. 5 pages (see p. 2-4, categorizing the cited references).

International Search Report for Application No. PCT/KR2025/002375 mailed Jun. 2, 2025. 3 pages.

George Odian, "Principles of Polymerization", Wiley-Interscience, Feb. 2004. 839 pages.

International Search Report for Application No. PCT/KR2025/002377 mailed May 26, 2025. 3 pages.

International Search Report for Application No. PCT/KR2025/095022 mailed Jul. 4, 2025. 3 pages.

Kim, Hae Chan, "Superabsorbent polymer with enhanced gel strength and heat resistance using itaconic acid-based oligomer", Polymers for Advanced Technologies, vol. 34, pp. 2564-2572, Apr. 25, 2023.

(56) References Cited

OTHER PUBLICATIONS

Menceloglu, Y., et al., "Triblock Superabsorbent Polymer Nanocomposites with Enhanced Water Retention Capacities and Rheological Characteristics", ACS Omega, vol. 7, Issue 24, pp. 20486-20494, Jun. 8, 2022.
International Search Report for Application No. PCT/KR2025/006025 mailed Aug. 6, 2025, 13 pages.
International Search Report for Application No. PCT/KR2025/006542 mailed Aug. 27, 2025, 9 pages.
International Search Report for Application No. PCT/KR2025/006675 mailed Aug. 27, 2025, 9 pages.
International Search Report for Application No. PCT/KR2025/006678 mailed Aug. 29, 2025, 11 pages.
Kwon, Y.R."Surface-crosslinking of itaconic acid-based superabsorbent polymer using a novel bio-based surface-crosslinker based on succinic acid" Polymer-Plastics Technology and Materials, Taylor & Francis, Mar. 2023, pp. 1057-1066, vol. 62, Issue 8.
Sharma, S. et al., "Superabsorbent Polymer Gels based on Polyaspartic Acid and Polyacrylic Acid" Journal of Material Science & Engineering, Feb. 2016, pp. 1-7, vol. 5, Issue 3.
Situ, Y, et al., "Synthesis and application of super absorbent polymers synthesized with ammonia solution and diatomaceous earth with low toxic residues" Environmental Technology & Innovation, Oct. 2023, pp. 1-12, vol. 32.
Kim, S., et al. Preparation of Surface-Reinforced Superabsorbent Polymer Hydrogel Microspheres via Incorporation of In Situ Synthesized Silver Nanoparticles. Polymers. Mar. 2021; 13(6):902. https://doi.org/10.3390/polym13060902. 11 pgs.

* cited by examiner

SUPER ABSORBENT POLYMER

CROSS-REFERENCE TO RELATED APPLICATION

This application claims priority to Korean Patent Application No. 10-2024-0023680 filed on Feb. 19, 2024, the content of which is incorporated by reference in its entirety.

BACKGROUND

The present disclosure herein relates to a super absorbent polymer, and more particularly, to a super absorbent polymer exhibiting excellent absorption behavior with respect to water having a low ion concentration and a low electrical conductivity, and particularly, having quick initial absorption speed, and a large maximum absorption capacity.

A super absorbent polymer (SAP) is a synthetic polymer material which has the ability to absorb moisture 500 times to 1,000 times its own weight, and is given different names, such as a super absorbency material (SAM) and an absorbent gel material (AGM), by each developer. The above-described super absorbent polymer was first put into practical use in sanitary articles, and is now widely used as a material for soil repair agents for horticulture, a civil engineering work, a construction index material, a seedling sheet, a freshness maintaining agent in a food distribution field, and a fomentation.

The super absorbent polymer is widely used in the field of hygiene products such as diapers or sanitary napkins, and to this end, it is necessary for the super absorbent polymer to exhibit high absorption with respect to moisture and the like, and the absorbed moisture should not escape even under external pressure, and it is necessary for the super absorbent polymer to exhibit an excellent initial absorbency.

Meanwhile, the super absorbent polymer is generally included in a dispersed state within a pulp in a hygiene product. However, in recent years, efforts have been made to provide sanitary products such as thinner diapers, and as part of the efforts, development of products with a reduced content of pulps, or furthermore, with no pulps, such as so-called pulpless diapers, is actively in progress. The quick initial absorption speed role that pulp has been in charge of is required of the super absorbent polymer itself.

As described above, in the case of a hygiene product with a reduced content of pulps or with no pulps, a super absorbent polymer is included in a relatively high ratio, so that super absorbent polymer particles are inevitably included in multiple layers in the hygiene product. In order for the total super absorbent polymer particles included in multiple layers to absorb a large amount of liquid such as urine more efficiently, the super absorbent polymer is required to exhibit not only high absorption performance but also quick absorption speed. Meanwhile, the most general method for increasing the above-described absorption properties may be a method for forming a porous structure inside a super absorbent polymer, thereby widening the surface area of the super absorbent polymer, and in order to widen the surface area of the super absorbent polymer, a method for forming a porous structure inside base polymer powder by including a foaming agent in a monomer composition and performing cross-linking polymerization is generally adopted.

However, there is a disadvantage in that overall physical properties of the super absorbent polymer, for example, surface tension, permeability, volume density, and the like are degraded due to the use of the foaming agent, and the amount of generated fine powder increases, and accordingly, there has been a continuous demand for the development of a technology capable of improving absorption properties of a super absorbent polymer without the use of a foaming agent.

Accordingly, in order to fundamentally solve the above-described problem, there has been a continuous demand for the development of a new super absorbent polymer which is prepared without generating fine powder, and which has an excellent initial absorbency so as to have an ability to be dried fast when in contact with moisture.

SUMMARY

The present disclosure is to provide a super absorbent resin which is excellent in initial absorption speed and maximum absorption capacity with respect to water having a low ion concentration and a low electrical conductivity, while simultaneously improving absorption performance such as centrifuge retention capacity and absorbency under pressure, so that the corresponding polymer may implement excellent quality when applied to an actual product.

In accordance with an exemplary aspect of the present disclosure, a super absorbent polymer, which is a polyacrylic acid (salt)-based super absorbent polymer, is provided wherein when free-swelling capacity (g/g) values over time (s) with respect to water having an electrical conductivity of 100 μS/cm to 130 μS/cm are modeled using Equation 1 below, the $S_e/r$ value is 3.0 g/g/sec or more.

$$S_t = S_e \times \left(1 - e^{-t/r}\right) \quad \text{[Equation 1]}$$

In Equation 1 above, t represents swelling time(s), $S_t$ represents the free-swelling capacity (g/g) of water having an electrical conductivity of 100 μS/cm to 130 μS/cm at the swelling time(s) t, and $S_e$ and r are constants calculated by modeling free-swelling capacity (g/g) values of water having an electrical conductivity of 100 μS/cm to 130 μS/cm over time(s) according to Equation 1.

BRIEF DESCRIPTION OF THE DRAWINGS

Exemplary aspects can be understood in more detail from the following description taken in conjunction with the accompanying drawings, in which.

DETAILED DESCRIPTION

Figure 1:
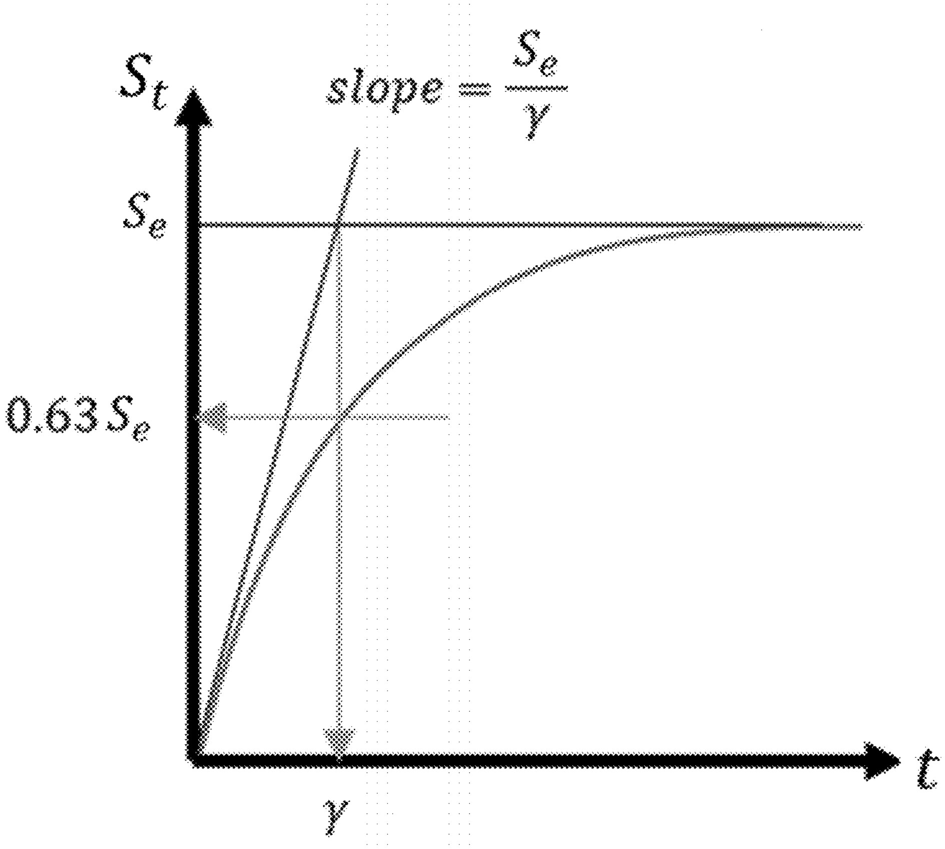
FIG. 1 is a graph schematically illustrating the free-swelling capacity of a super absorbent polymer over time.

Unless otherwise defined herein, all technical and scientific terms are used to describe illustrative aspects only and are not intended to limit the present disclosure. The terms of a singular form may include plural forms unless the context clearly indicates otherwise. In the present specification, it should be understood that the terms, "include," "comprise," or "have" are intended to specify the presence of stated features, numbers, steps, elements, or combinations thereof, but do not preclude the presence or addition of one or more other features, numbers, steps, elements, or combinations thereof.

The present disclosure may be modified in various ways and may take many forms, and specific aspects are illustrated and described in detail below. It should be understood, however, that it is not intended to limit the present disclosure to the particular forms disclosed, but rather, is intended to cover all modifications, equivalents, and alternatives falling within the spirit and scope of the above ideas and techniques.

The terminology used herein is for reference only to particular implementations, and is not intended to limit the present disclosure. In addition, the singular forms used herein include plural forms, unless the phrases clearly indicate the opposite meaning.

The term "polymer" as used in the specification of the present disclosure means that a water-soluble ethylene-based polyunsaturated monomer is in a polymerized state, and may cover any moisture content range or particle size range.

In addition, the term "super absorbent polymer" either means, depending on the context, a cross-linked polymer, or a base polymer in the form of powder in which the cross-linked polymer is made of pulverized super absorbent polymer particles, or is used to cover the cross-linked polymer or the base polymer subjected to additional processes, such as drying, pulverization, classification, surface cross-linking, etc., thereby being in a state suitable for commercialization.

In addition, the term "fine powder" means particles having a particle size of less than 150 μm among super absorbent polymer particles. The particle size of the above-described polymer particles may be measured according to the method of EDANA WSP 220.3 of the European Disposables and Nonwovens Association (EDANA) standards.

In addition, the term "chopping" refers to cutting a hydrogel polymer into small pieces in a millimeter unit to increase drying efficiency, and is used separately from pulverizing the same to a micrometer or normal particle level.

In addition, the term "micronizing, or micronization" refers to pulverizing a hydrogel polymer into pieces having a particle diameter of tens to hundreds of micrometers, and is used separately from "chopping."

In addition, the term "free swelling" refers to a state in which a super absorbent polymer may swell without a suppressing load when absorbing a specific solution.

Hereinafter, a super absorbent polymer according to a specific aspect of the present disclosure and a preparation method therefor will be described in more detail.

I. Polyacrylic Acid (Salt)-Based Super Absorbent Polymer

The super absorbent polymer according to one aspect of the present disclosure is a polyacrylic acid (salt)-based super absorbent polymer, wherein when free-swelling capacity (g/g) values over time(s) with respect to water having an electrical conductivity of 100 μS/cm to 130 μS/cm are modeled using Equation 1 below, the $S_e/r$ value is 3.0 g/g/sec or more.

$$S_t = S_e \times \left(1 - e^{-t/r}\right) \quad \text{[Equation 1]}$$

In Equation 1 above, t represents swelling time(s), $S_t$ represents the free-swelling capacity (g/g) of water having an electrical conductivity of 100 μS/cm to 130 μS/cm at the swelling time(s) t, and $S_e$ and r are constants calculated by modeling free-swelling capacity (g/g) values of water having an electrical conductivity of 100 μS/cm to 130 μS/cm over time(s) according to Equation 1.

In recent years, as part of providing thinner hygiene products, the development of products with a reduced pulp content in hygiene products has been actively conducted, and accordingly, a super absorbent polymer itself is required to play the role of exhibiting quick initial absorption speed, the role of which has been played by pulp until now.

That is, in the case of using a super absorbent polymer in the hygiene product field, the super absorbent polymer is required to have an excellent initial absorbency so as to have an ability to be dried fast when in contact with moisture.

The absorption behavior of the free-swelling capacity (g/g) of a super absorbent polymer over time is known to follow the Voigt model equation. That is, if free-swelling capacity (g/g) values are measured over a period of time for a super absorbent polymer, and then the relationship between the free-swelling capacity (g/g) values over time is modeled as an equation, the relationship may be formulated in a form such as the Voigt model equation.

The "Voigt model equation" is a model of a material represented in parallel of a viscous body (dashpot) and an elastic body (spring) in order to represent the behavior of a viscoelastic material (polymer), and is a model applied to described a creep phenomenon such as chain movement or rearrangement of the material (polymer) when stress is applied.

The Voigt model equation is generally represented by the following equation.

$$\epsilon = \frac{\sigma}{E}\left(1 - e^{-\frac{t}{\gamma}}\right)$$

If the relationship between free-swelling capacity (g/g) values of a super absorbent polymer over time is formulated in the form of a Voigt model equation, there is an advantage in that absorption properties of the super absorbent polymer, such as the initial absorption speed or maximum absorption capacity can be predicted.

FIG. 1 is a graph schematically illustrating the free-swelling capacity of a super absorbent polymer over time, and as shown in FIG. 1, when time (t) is 0, the slope of a tangent line is related to the initial absorption speed of the super absorbent polymer, and when the time (t) is infinite, the free-swelling capacity is related to the maximum absorption capacity, so that if the relationship between the free-swelling capacity (g/g) values of the super absorbent polymer over time is formulated in the form of a Voigt model equation to confirm the slope of the tangent line when the time (t) is 0 and the free-swelling capacity value when the time (t) is infinite, it can determine how excellent the initial absorption speed or the maximum absorption capacity of the super absorbent polymer would be.

In the case of using 0.9% salt water which has an ion concentration and an electrical conductivity similar to those of urine discharged from the body to formulate free-swelling capacity (g/g) values over time in the form of a Voigt model equation, there is an advantage in that absorption properties of the super absorbent polymer when used in an actual hygiene product and the like may be identified.

However, in the case of the 0.9% salt water, the concentration of ions is high, so that the amount thereof absorbed into the super absorbent polymer is small, and the absorption speed is relatively slow. Therefore, even if the super absorbent polymer is formulated in the form of a Voigt model equation, there is a disadvantage in that it is difficult to accurately compare the absorption properties between super absorbent polymers. In addition, there is a disadvantage in that it is difficult to predict absorption properties of water other than the 0.9% salt water, that is, water having a low ion concentration such as distilled water or tap water.

Even if the same super absorbent polymer is used, the absorption behavior in water having an electrical conductivity of 100 μS/cm to 130 μS/cm and the absorption behavior in 0.9% salt water having an electrical conductivity of about 16,100 μS/cm are bound to be different, and accordingly, it is not possible to predict the initial absorption speed or maximum absorption capacity of the water having an electrical conductivity of 100 μS/cm to 130 μS/cm by using the initial absorption speed or maximum absorption capacity of the 0.9% salt water having an electrical conductivity of about 16,100 μS/cm, and vice versa.

Therefore, in order to implement a super absorbent polymer having an excellent physical property balance by simultaneously improving initial absorption speed and maximum absorption capacity, identifying the absorption performance and absorption speed in water having an electrical conductivity of 100 μS/cm to 130 μS/cm may be independently meaningful separate from using 0.9% salt water having an electrical conductivity of about 16,100 μS/cm.

Accordingly, the present inventors measured the absorption behavior of a super absorbent polymer, particularly, the free-swelling capacity (g/g) over time, by using water having an ion concentration and an electrical conductivity lower than those of 0.9% salt water, that is, water having an electrical conductivity of 100 μS/cm to 130 μS/cm, which is an electrical conductivity of about 1/100 of the electrical conductivity of the 0.9% salt water, and the free-swelling capacity (g/g) over time with respect to the water having an electrical conductivity of 100 μS/cm to 130 μS/cm was formulated in the form of a Voigt model equation.

If free-swelling capacity (g/g) values of the super absorbent polymer over time with respect to water having an electrical conductivity of 100 μS/cm to 130 μS/cm are modeled according to the Voigt model equation, the values are represented by Equation 1 below:

$$S_t = S_e \times \left(1 - e^{-t/r}\right) \quad \text{[Equation 1]}$$

In Equation 1 above, t represents swelling time(s), St represents the free-swelling capacity (g/g) of water having an electrical conductivity of 100 μS/cm to 130 μS/cm at the swelling time(s) t, and $S_e$ and r are constants calculated by modeling free-swelling capacity (g/g) values of water having an electrical conductivity of 100 μS/cm to 130 μS/cm over time(s) according to Equation 1.

The $S_e$ and r values vary depending on the absorption properties of a super absorbent polymer.

FIG. 1 is a graph schematically illustrating the absorption capacity of a super absorbent polymer over time.

As shown in FIG. 1, the slope of a tangent line at a specific time (t) refers to the absorption speed during the specific time interval, so that the slope of a tangent line when t is 0 may mean the initial absorption speed.

Since the slope value of a tangent line when t is 0 is $S_e/r$, it can be seen that the $S_e/r$ value is related to the initial absorption speed in water having an electrical conductivity of 100 μS/cm to 130 μS/cm.

In addition, it can be seen that the free-swelling capacity (g/g) of water having an electrical conductivity of 100 μS/cm to 130 μS/cm converges to a constant value $S_e$ as the t increases (the t become closer to infinity), through which it can be seen that the $S_e$ value is related to the maximum absorption capacity in the water having an electrical conductivity of 100 μS/cm to 130 μS/cm.

The super absorbent polymer according to the present disclosure has a large $S_e/r$ value, which is related to the initial absorption speed with respect to water having an electrical conductivity of 100 μS/cm to 130 μS/cm, and has a large $S_e$ value, which is related to the maximum absorption capacity in water having an electrical conductivity of 100 μS/cm to 130 μS/cm.

Therefore, it can be seen that the super absorbent polymer according to the present disclosure is excellent in both initial absorption speed and maximum absorption capacity with respect to water having an electrical conductivity 100 μS/cm to 130 μS/cm.

Figure 2:
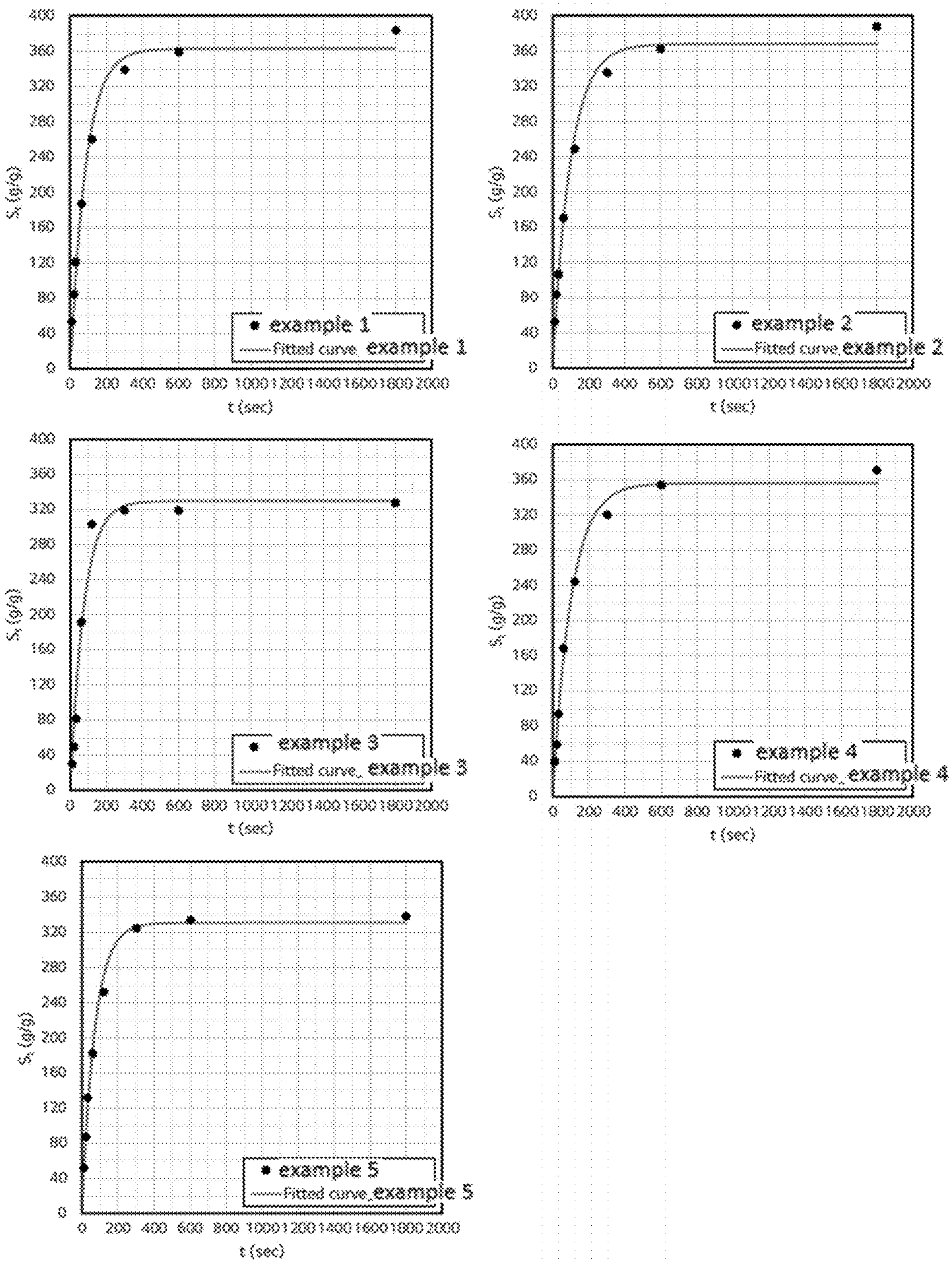
FIG. 2 is a graph obtained by modeling the absorption behavior of a super absorbent polymer of an example over time in water having an electrical conductivity of 110 μS/cm according to Equation 1.
Figure 3:
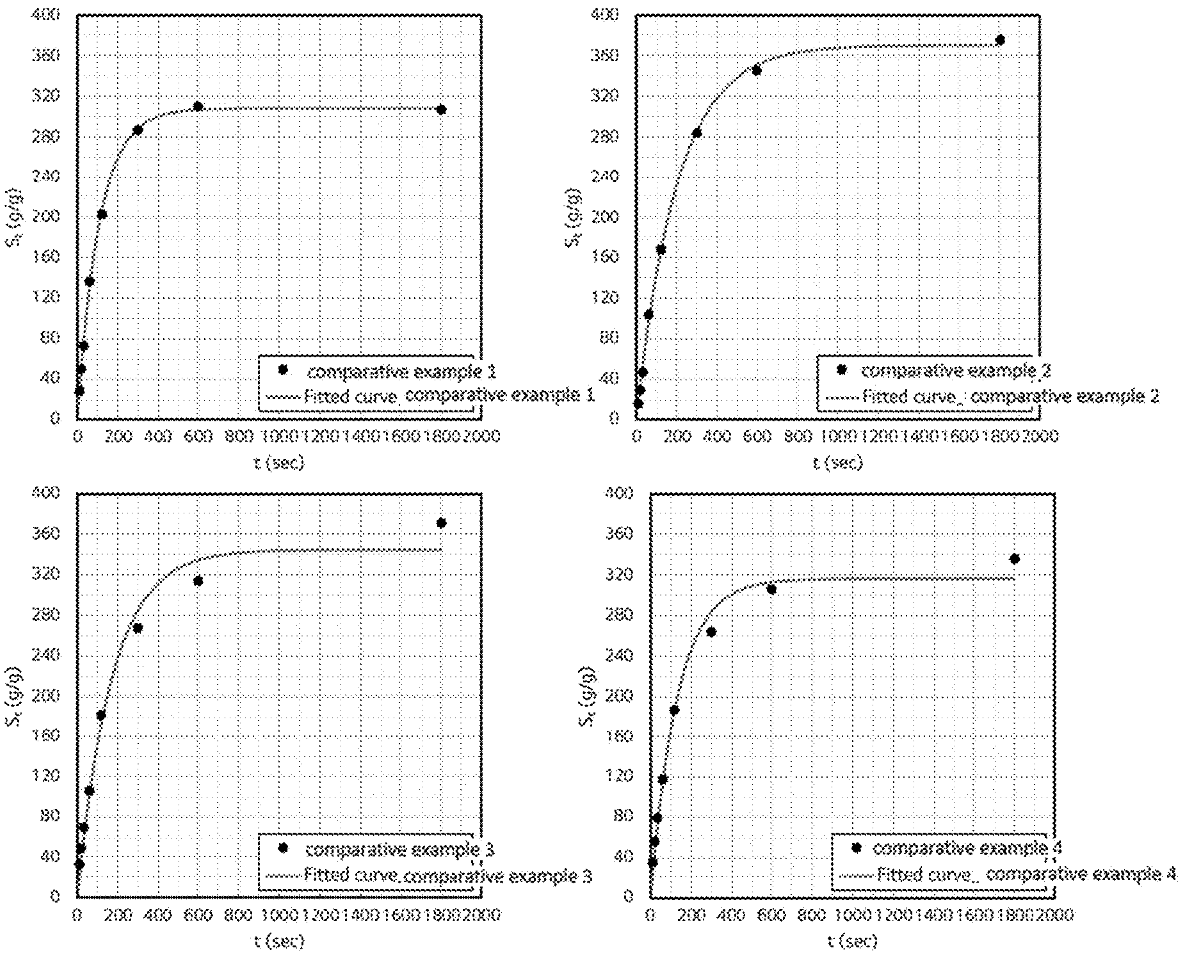
FIG. 3 is a graph obtained by modeling the absorption behavior of a super absorbent polymer of a comparative example over time in water having an electrical conductivity of 110 μS/cm according to Equation 1.

Meanwhile, FIG. 2 is a graph obtained by modeling the absorption behavior of a super absorbent polymer of an example over time in water having an electrical conductivity of 110 μS/cm according to Equation 1, and FIG. 3 is a graph obtained by modeling the absorption behavior over time in water having an electrical conductivity of 110 μS/cm with respect to a super absorbent polymer of a comparative example according to Equation 1, and as shown in FIG. 2 and FIG. 3 above, if free-swelling capacity values of the super absorbent polymer over time in water having an electrical conductivity 110 μS/cm are expressed as dots, it can be confirmed that the values satisfy an equation according to Equation 1.

Specifically, the super absorbent polymer of the present disclosure is a polyacrylic acid (salt)-based super absorbent polymer, and when free-swelling capacity (g/g) values over time(s) with respect to water having an electrical conductivity of 100 μS/cm to 130 μS/cm are modeled using Equation 1 above, the $S_e/r$ value may be 3.0 g/g/sec or more, 3.3 g/g/sec or more, 3.5 g/g/sec or more, or 3.7 g/g/sec or more.

As described above, if used in a hygiene product such as a diaper or a sanitary napkin, the super absorbent polymer is required to have an ability to be dried fast when in contact with moisture, and needs to have an excellent initial absorbency, and if the super absorbent polymer has an $S_e/r$ value of Equation 1 of less than 3.0 g/g/sec, the super absorbent polymer does not immediately absorb water, and thus, may cause discomfort when in contact with the skin.

Meanwhile, the super absorbent polymer of the present disclosure may have an $S_e$ value of 310 g/g or more, 320 g/g or more, or 330 g/g or more, when free-swelling capacity (g/g) values over time(s) with respect to water having an electrical conductivity of 100 μS/cm to 130 μS/cm are modeled using Equation 1 above.

As described above, an $S_e$ value is related to the maximum absorption capacity with respect to water having an electrical conductivity of 100 μS/cm to 130 μS/cm, and when the Se value is less than 310 g/g, the centrifuge retention capacity, one of the physical property of the super absorbent polymer, may be significantly reduced.

Meanwhile, in Equation 1 above, t refers to the swelling time(s), and in theory, t may be infinite, and specifically, may be 1800 seconds or more, and for example, may be 0 second to 1800 seconds.

In addition, $S_t$ represents the free-swelling capacity (g/g) of water having an electrical conductivity of 100 μS/cm to 130 μS/cm at the swelling time(s) t, and although the specific free-swelling capacity (g/g) varies depending on time, the super absorbent polymer of the present disclosure may have an $S_t$ value of 20 g/g or more, 25 g/g or more, or 30 g/g or more at 10 seconds, 40 g/g or more, 45 g/g or more, or 50 g/g or more at 20 seconds, 70 g/g or more, 75 g/g or more, or 80 g/g or more at 30 seconds, 140 g/g or more, 150 g/g or more, or 160 g/g or more at 60 seconds, 200 g/g or more, 220 g/g or more, or 240 g/g or more at 120 seconds, 280 g/g or more, 290 g/g or more, or 300 g/g or more at 300 seconds, 305 g/g or more, 310 g/g or more, or 315 g/g or more at 600 seconds, and 315 g/g or more, 320 g/g or more, or 325 g/g or more at 1800 seconds. It can be seen that as the $S_t$ value increases, the more water having an electrical conductivity of 100 μS/cm to 130 μS/cm is absorbed, but as an example, $S_t$ may be 400 g/g or less at 1800 seconds.

The super absorbent polymer of the present disclosure satisfies a predetermined value or above of an Se/r value and an Se value, which are obtained by modeling free-swelling capacity (g/g) values over time(s) with respect to water having an electrical conductivity of 100 μS/cm to 130 μS/cm using Equation 1 above, and thus, it is possible to provide a super absorbent polymer excellent in initial absorption speed and maximum absorption capacity and also excellent in physical property balance by simultaneously improving absorption performance such as centrifuge retention capacity and absorbency under pressure.

The present inventors used, as the water having a low ion concentration compared to the 0.9% salt water, water having an electrical conductivity of 100 μS/cm to 130 μS/cm, which is an electrical conductivity of about 1/100 of the electrical conductivity of about 16,100 μS/cm of the 0.9% salt water, to identify the absorption behavior of the super absorbent polymer. In the case of water within an electrical conductivity range of 100 μS/cm to 130 μS/cm, there is no significant difference in absorption properties, so that water which belongs to the above-described electrical conductivity range may be used, and for example, water having an electrical conductivity of 110 μS/cm may be used.

Distilled water having the ion concentration and the electrical conductivity close to 0 is not desirable because it is difficult to compare the absorption performance between super absorbent polymers due to excessive expansion of the super absorbent polymers.

Meanwhile, even if two different super absorbent polymers have similar $S_e$ and r values calculated through the free-swelling capacity over time in 0.9% salt water, $S_e$ and r values calculated through the free-swelling capacity over time in water having an electrical conductivity of 100 μS/cm to 130 μS/cm may greatly vary, and this is because absorption properties of the super absorbent polymer itself, such as the degree of cross-linking inside the super absorbent polymer, affect the values.

For the above-described reason, it is not possible to directly compare $S_e$ and $S_e/r$ values calculated through the free-swelling capacity over time in 0.9% salt water having an electrical conductivity of about 16,100 μS/cm and $S_e$ and $S_e/r$ values calculated through the free-swelling capacity over time in water having an electrical conductivity of 100 μS/cm to 130 μS/cm.

Meanwhile, the super absorbent polymer of the present disclosure may have a centrifuge retention capacity (CRC) in the range of about 33 g/g or more, about 34 g/g or more, or about 35 g/g or more, and about 50 g/g or less, about 45 g/g or less, or about 40 g/g or less, as measured according to the method of EDANA WSP 241.3.

In addition, the super absorbent polymer of the present disclosure may have an absorbency under pressure (AUP) of 2.07 kPa (0.3 psi) in the range of about 25 g/g or more, about 27 g/g or more, about 28 g/g or more, about 29 g/g or more, or about 30 g/g or more, and about 45 g/g or less, about 42 g/g or less, or about 40 g/g or less, as measured according to the method of EDANA WSP 242.3.

The super absorbent polymer of the present disclosure may have a vortex time of 40 seconds or less as measured by a vortex measuring method at 24.0° C.

More specifically, the vortex time may be 40 seconds or less, 35 seconds or less, 33 seconds or less, or 30 seconds or less. In addition, the smaller the value, the better the vortex time, and although the lower limit of the vortex time is theoretically 0 second, it may be, for example, 10 seconds or more, 15 seconds or more, or 20 seconds or more.

A method for measuring the centrifuge retention capacity, the absorbency under pressure, and the absorption speed of the super absorbent polymer will be described in more detail in the experimental examples to be described later.

As described above, by controlling the $S_e/r$ value obtained by modeling free-swelling capacity (g/g) values of the super absorbent polymer of the present disclosure over time(s) with respect to water having an electrical conductivity of 100 μS/cm to 130 μS/cm to a predetermined level or above, absorption properties such as centrifuge retention capacity (CRC), absorbency under pressure (AUP), and absorption speed become at an equal level or above, and the content of extractable contents (EC) is lowered, so that it is possible to simultaneously improve properties such as permeability and rewet properties, which are properties opposite to the absorption properties.

Meanwhile, when free-swelling capacity (g/g) values of the super absorbent polymer over time(s) with respect to water having an electrical conductivity of 100 μS/cm to 130 μS/cm are modeled using Equation 1 above, the $S_e/r$ value and the $S_e$ value may be implemented by controlling the composition/content of the super absorbent polymer, preparation process conditions of the super absorbent polymer, and the like.

For example, by the control of the type and content of the monomer composition, and the type and amount of the internal cross-linking agent in the polymerization process, the type, introduction amount, and introduction timing of the surfactant, and the type, introduction amount, and introduction timing of the neutralizing agent in the micronization and neutralization steps, the type, rotation speed, hole size, and number of micronization times of a micronization device, the $S_e/r$ value obtained by modeling free-swelling capacity (g/g) values of the super absorbent polymer over time(s) with respect to water having an electrical conductivity of 100 μS/cm to 130 μS/cm using Equation 1 above may be controlled to a predetermined level or above.

This will be described in more detail in Item II of the method for preparing a super absorbent polymer.

Hereinafter, each component constituting the super absorbent polymer will be described in more detail.

A polyacrylic acid (salt)-based super absorbent polymer of an aspect of the present disclosure includes a base polymer including a water-soluble ethylene-based unsaturated monomer having an acid group and a cross-linked polymer of an internal cross-linking agent. The cross-linked polymer may preferably be formed by polymerizing a monomer composition which includes components such as a monomer, an internal cross-linking agent, a polymerization initiator, and the like.

Here, the water-soluble ethylene-based unsaturated monomer may be any monomer commonly used in the preparation of a super absorbent polymer. As a non-limiting example, the water-soluble ethylene-based unsaturated monomer may be a compound represented by Formula 1 below.

R—COOM' [Formula 1]

In Formula 1 above, R is an alkyl group having 2 to 5 carbon atoms including an unsaturated bond, and M' is a hydrogen atom, a monovalent or divalent metal, an ammonium group, or an organic amine salt.

Preferably, the monomer may be a (meth)acrylic acid, and one or more selected from the group consisting of a monovalent (alkali) metal salt, a divalent metal salt, an ammonium salt, and organic amine salt of these acids.

If the (meth)acrylic acid and/or a salt thereof is used as the water-soluble ethylene-based unsaturated monomer as described above, it is advantageous in terms of obtaining a super absorbent polymer with improved absorbency. In addition, as the monomer, maleic anhydride, fumaric acid, crotonic acid, itaconic acid, 2-acryloylethane sulfonic acid, 2-methacryloylethanesulfonic acid, 2-(meth)acryloylpropanesulfonic acid or 2-(meth)acrylamide-2-methyl propane sulfonic acid, (meth)acrylamide, N-substituted (meth)acrylate, 2-hydroxyethyl (meth)acrylate, 2-hydroxypropyl (meth)acrylate, methoxypolyethylene glycol (meth)acrylate, polyethylene glycol (meth)acrylate, (N,N)-dimethylaminoethyl (meth)acrylate, (N,N)-dimethylaminopropyl (meth) acrylamide, or the like may be used.

The water-soluble ethylene-based unsaturated monomer has an acid group. Meanwhile, in the preparation of the super absorbent polymer, at least a portion of the acid group forms a polymer by cross-linking a monomer neutralized by a neutralizing agent, but in the present disclosure, the acid group may preferably be neutralized not during polymerization, but after the formation of a polymer. More specific details on this will be provided in the section on a method for preparing a super absorbent polymer.

The concentration of the water-soluble ethylene-based unsaturated monomer in the monomer composition may be appropriately controlled in consideration of polymerization time, reaction conditions, etc., and may be about 20 wt % to about 60 wt %, or about 20 wt % to about 40 wt %.

As used herein, the term "internal cross-linking agent" is a term used to distinguish the same from a surface cross-linking agent for cross-linking the surface of super absorbent polymer particles to be described later, and an internal cross-linking agent serves to form a polymer including a cross-linking structure by introducing a cross-linking bond between unsaturated bonds of the above-described water-soluble ethylene-based unsaturated monomers.

The cross-linking in the above step is performed without distinction between the surface and the inside, but if a surface cross-linking process of the super absorbent polymer particles to be described later is performed, the surfaces of finally prepared super absorbent polymer particles may include a structure newly cross-linked by the surface cross-linking agent, and the inside of the super absorbent polymer particles may maintain a structure cross-linked by the internal cross-linking agent. According to an aspect of the present disclosure, the internal cross-linking agent may include one or more of a polyfunctional acrylate-based compound, a polyfunctional allyl-based compound, or a polyfunctional vinyl-based compound.

Non-limiting examples of the polyfunctional acrylate-based compound may include ethylene glycol di(meth) acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, tripropylene glycol di(meth)acrylate, polypropylene glycol di(meth)acrylate, butanediol di(meth) acrylate, butylene glycol di(meth)acrylate, hexanediol di(meth)acrylate, pentaerythritol di(meth)acrylate, pentaerythritol tri(meth)acrylate, pentaerythritol tetra(meth) acrylate, dipentaerythritol di(meth)acrylate, dipentaerythritol tri(meth)acrylate, dipentaerythritol tetra(meth)acrylate, dipentaerythritol penta(meth)acrylate, trimethylolpropane di(meth)acrylate, trimethylolpropane tri(meth)acrylate, glycerin di(meth)acrylate, glycerin tri(meth)acrylate, and the like, and any one thereof may be used alone, or two or more thereof may be mixed and used.

Non-limiting examples of the polyfunctional allyl-based compound may include ethylene glycol diallyl ether, diethylene glycol diallyl ether, triethylene glycol diallyl ether, tetraethylene glycol diallyl ether, polyethylene glycol diallyl ether, propylene glycol diallyl ether, tripropyleneglycol diallyl ether, polypropylene glycol diallyl ether, butanediol diallyl ether, butylene glycol diallyl ether, hexanediol diallyl ether, pentaerythritol diallyl ether, pentaerythritol triallyl ether, pentaerythritol tetraallyl ether, dipentaerythritol diallyl ether, dipentaerythritol triallyl ether, dipentaerythritol tetraallyl ether, dipentaerythritol pentaallyl ether, trimethylolpropane diallyl ether, trimethylolpropane triallyl ether, glycerin diallyl ether, glycerin triallyl ether, and the like, and any one thereof may be used alone, or two or more thereof may be mixed and used.

Non-limiting examples of the polyfunctional vinyl-based compound may include ethylene glycol divinyl ether, diethylene glycol divinyl ether, triethylene glycol divinyl ether, tetraethylene glycol divinyl ether, polyethylene glycol divinyl ether, propylene glycol divinyl ether, tripropylene glycol divinyl ether, polypropylene glycol divinyl ether, butanediol divinyl ether, butylene glycol divinyl ether, hexanediol divinyl ether, pentaerythritol divinyl ether, pentaerythritol trivinyl ether, pentaerythritol tetravinyl ether, dipentaerythritol divinyl ether, dipentaerythritol trivinyl ether, dipentaerythritol tetravinyl ether, dipentaerythritol pentavinyl ether, trimethylolpropane divinyl ether, trimethylolpropane trivinyl ether, glycerin divinyl ether, glycerin trivinyl ether, and the like, and any one thereof may be used alone or two or more thereof may be mixed and used. Preferably, pentaerythritol triallyl ether may be used.

In the above-described polyfunctional allyl-based compound, or the polyfunctional vinyl-based compound, two or more unsaturated groups included in a molecule may be respectively bonded to unsaturated bonds of the water-soluble ethylene-based unsaturated monomers or unsaturated bonds of another internal cross-linking agent, thereby forming a cross-linking structure during a polymerization process, and unlike an acrylate-based compound including an ester bond (—(C=O)O—) in a molecule, may maintain cross-linking bonds more stably even during a neutralization process to be described later after the polymerization reaction. Accordingly, the gel strength of a prepared super absorbent polymer may increase, the process stability may increase during a discharge process after polymerization, and the amount of extractable contents may be reduced to a minimum.

Cross-linking polymerization of the water-soluble ethylene-based unsaturated monomer in the presence of the above-described internal cross-linking agent may be performed in the presence of a polymerization initiator, and if necessary, a thickener, a plasticizer, a preservation stabilizer, an antioxidant, and the like.

In the monomer composition, the above-described internal cross-linking agent may be used in an amount of 0.01 parts by weight to 5 parts by weight based on 100 parts by weight of the water-soluble ethylene-based unsaturated monomer. For example, the internal cross-linking agent may be used in an amount of 0.01 parts by weight or more, 0.05 parts by weight or more, or 0.1 parts by weight or more, and 5 parts by weight or less, 3 parts by weight or less, 2 parts by weight or less, 1 part by weight or less, or 0.7 parts by weight or less. If the content of the internal cross-linking agent is too low, cross-linking is not sufficiently achieved, so that it may be difficult to implement strength of an appropriate level or above, and if the content of the internal cross-linking agent is too high, the internal cross-linking density increases, so that it may be difficult to implement a desired centrifuge retention capacity. Particularly, in the above-described range, it is suitable to implement the $S_e/r$ value obtained by modeling free-swelling capacity (g/g) values of the super absorbent polymer of the present disclosure over time(s) with respect to water having an electrical conductivity of 100 μS/cm to 130 μS/cm using Equation 1 above to be within a desired range.

Meanwhile, if the internal cross-linking agent is used in a small content to allow the base polymer to have a high centrifuge retention capacity (CRC), the gel strength of a prepared polymer may be lowered, and due to the low gel strength, it may be difficult to operate a micronizer and the like when micronizing a hydrogel polymer. In this case, two or more types of internal cross-linking agents may be mixed and used for the operation of a high-speed rotating micronizer and the like to increase the gel strength, thereby increasing the operating stability of the micronizing and the like.

The shape of particles of the formed hydrogel polymer may change depending on the degree of internal cross-linking, and a polymer formed using such an internal cross-linking agent may have a three-dimensional network structure in the form in which main chains formed by the polymerization of the water-soluble ethylene-based unsaturated monomers are cross-linked by the internal cross-linking agent.

As described above, if a polymer has a three-dimensional network structure, the centrifuge retention capacity and the absorbency under pressure, which are overall physical properties of a super absorbent polymer, may be significantly improved compared to having a two-dimensional linear structure in which additional cross-linking is not performed by an internal cross-linking agent.

The polymer is prepared by polymerizing a monomer and an internal cross-linking agent in the presence of a polymerization initiator, and the type of the polymerization initiator is not particularly limited, but preferably, the polymerization may be performed using a thermal polymerization method in a batch reactor, and accordingly, a thermal polymerization initiator may be used as the polymerization initiator.

As the thermal polymerization initiator, one or more selected from the group consisting of a persulfate-based initiator, an azo-based initiator, and an initiator composed of hydrogen peroxide and ascorbic acid may be used. Specifically, examples of the persulfate-based initiator include sodium persulfate ($Na_2S_2O_8$), potassium persulfate ($K_2S_2O_8$), ammonium persulfate ($(NH_4)_2S_2O_8$), and the like, and examples of the azo-based initiator include 2,2-azobis(2-amidinopropane) dihydrochloride, 2,2-azobis-(N, N-dimethylene) isobutyramidine dihydrochloride, 2-(carbamoylazo) isobutylonitril, 2,2-azobis [2-(2-imidazolin-2-yl) propane] dihydrochloride, 4,4-azobis-(4-cyanovaleric acid), and the like. More various thermal polymerization initiators are well specified on p203 of 'Principle of Polymerization (Wiley, 1981)' written by Odian, and are not limited to the above-described examples.

The above-described polymerization initiator may be used in an amount of 2 parts by weight or less based on 100 parts by weight of the water-soluble ethylene-based unsaturated monomer. That is, if the concentration of the polymerization initiator is too low, it is not preferable in that the polymerization rate may decrease, and remaining monomers may be extracted in a large amount in a final product. On the contrary, if the concentration of the polymerization initiator is higher than the above-described range, it is not preferable in that polymer chains forming a network is shortened, thereby degrading the physical properties of a polymer, such as increasing the content of extractable contents and lowering the absorbency under pressure.

Meanwhile, in an aspect of the present disclosure, the above-described polymerization initiator and a reducing agent forming a redox couple may be introduced together to the monomer composition to initiate polymerization.

Specifically, the initiator and the reducing agent react with each other when introduced to a polymer solution and form radicals.

The formed radicals react with the monomer, and since an oxidation-reduction reaction between the initiator and the reducing agent is highly reactive, polymerization is initiated even when only a trace amount of the initiator and the reducing agent are introduced, so that it is not necessary to increase the process temperature, thereby allowing low-temperature polymerization, and it is possible to minimize changes in physical properties of the polymer solution.

The polymerization reaction using the oxidation-reduction reaction may smoothly occur even at a temperature near or below room temperature (25° C.). For example, the polymerization reaction may be performed at a temperature of 5° C. to 25° C. or 5° C. to 20° C.

In an aspect of the present disclosure, if a persulfate-based initiator is used as the initiator, the reducing agent may be one or more selected from the group consisting of sodium metabisulfite ($Na_2S_2O_5$), tetramethyl ethylenediamine (TMEDA), a mixture of iron (II) sulfate and EDTA ($FeSO_4$/EDTA), sodium formaldehyde sulfoxylate, and disodium 2-hydroxy-2-sulfinoacteate.

In some aspect, potassium persulfate may be used as the initiator, and disodium 2-hydroxy-2-sulfinoacteate may be used as the reducing agent, ammonium persulfate may be used as the initiator, and tetramethylammoniumdiamine may be used as the reducing agent, sodium persulfate may be used as the initiator, and sodium formaldehyde sulfoxylate may be used as the reducing agent.

In another aspect of the present disclosure, when a hydrogen peroxide-based initiator is used as the initiator, the reducing agent may be one or more selected from the group consisting of ascorbic acid, sucrose, sodium sulfite ($Na_2SO_3$), sodium metabisulfite ($Na_2S_2O_5$), tetramethyl ethylenediamine (TMEDA), a mixture of iron (II) sulfate and EDTA ($FeSO_4$/EDTA), sodium formaldehyde sulfoxylate, disodium 2-hydroxy-2-sulfinoacteate, and disodium 2-hydroxy-2-sulfoacteate.

The above-described monomer composition may further include an additive such as a thickener, a plasticizer, a preservation stabilizer, an antioxidant, or the like, if necessary.

In addition, the monomer composition including monomers may be, for example, in the state of a solution dissolved in a solvent such as water, and the content of solids in the monomer composition of the above-described solution state, i.e., the concentration of the monomers, the internal cross-linking agent, and the polymerization initiator, may be controlled appropriately in consideration of the polymerization time, reaction conditions, etc. For example, the content of solids in the monomer composition may be 10 wt % to 80 wt %, 15 wt % to 60 wt %, or 30 wt % to 50 wt %.

A solvent that may be used at this time may be used without limitation in composition as long as the solvent can dissolve the above-mentioned components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butylolactone, carbitol, methyl cellosolve acetate, N,N-dimethylacetamide, or the like may be used in combination.

The polymer obtained by the above-described method may form a polymer having a high molecular weight and a uniform molecular weight distribution due to polymerization using an ethylene-based unsaturated monomer in an unneutralized state, and is suitable to implement the $S_e/r$ value obtained by modeling free-swelling capacity (g/g) values over time(s) with respect to water having an electrical conductivity of 100 μS/cm to 130 μS/cm using Equation 1 above, which is a desired value, due to a reduced content of the extractable contents.

In addition, the polymer may have a moisture content of 30 wt % to 80 wt %. For example, the moisture content of the polymer may be 30 wt % or more, or 45 wt % or more, or 50 wt % or more, and 80 wt % or less, 70 wt % or less, or 60 wt % or less.

If the moisture content of the polymer is too low, it is difficult to obtain an appropriate surface area in a pulverization step, so that effective pulverization may not be achieved, and if the moisture content of the polymer is too high, a pressure applied in the pulverization step may increase, so that it may be difficult to perform pulverization to a desired particle size.

Meanwhile, throughout the present specification, the term "moisture content" refers to a value obtained by subtracting the weight of a polymer in a dry state from the weight of the polymer by the content of moisture occupying with respect to the total weight of the polymer. Specifically, the moisture content is defined as a value calculated by measuring the weight loss due to moisture evaporation from a polymer during a drying process performed by raising the temperature of the polymer in a crumb state through infrared heating. At this time, conditions of the drying are to increase the temperature from room temperature to about 180° C. and then maintain the temperature at 180° C., and the total drying time is set to 40 minutes, including 5 minutes for raising the temperature, and then the moisture content is measured.

The super absorbent polymer according to an aspect of the present disclosure includes the above-described base polymer powder containing the water-soluble ethylene-based unsaturated monomer having an acid group and the cross-linked polymer of an internal cross-linking agent, and a surface cross-linked layer formed on the base polymer powder by further cross-linking the cross-linked polymer by means of a surface cross-linking agent.

The surface cross-linked layer is formed on at least a portion of the surface of the base polymer powder, and may be formed by further cross-linking the cross-linked polymer included in the base polymer powder by means of the surface cross-linking agent.

As the surface cross-linking agent, any surface cross-linking agent used in the preparation of a super absorbent polymer may be used without particular limitation. For example, the surface cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, and glycerol, at least one carbonate-based compound selected from the group consisting of ethylene carbonate, propylene carbonate, and glycerol carbonate, an epoxy compound such as ethylene glycol diglycidyl ether, an oxazoline compound such as oxazolidinone, a polyamine compound, a mono-, di- or polyoxazolidinone compound, a cyclic urea compound, or the like.

Specifically, one or more, two or more, or three or more of the above-described surface cross-linking agents may be used as the surface cross-linking agent, and for example, ethylene carbonate-propylene carbonate (ECPC), propylene glycol, and/or glycerol carbonate may be used.

The above-described surface cross-linking agent may be used in an amount of about 0.001 parts by weight to about 5 parts by weight based on 100 parts by weight of the super absorbent polymer particles. For example, the surface cross-linking agent may be used in an amount of 0.005 parts by weight or more, 0.01 parts by weight or more, or 0.05 parts by weight or more, and 5 parts by weight or less, 4 parts by weight or less, or 3 parts by weight or less based on 100 parts by weight of the super absorbent polymer particles. The content range of the surface cross-linking agent may be controlled to be within the above-described range to prepare a super absorbent polymer exhibiting excellent overall absorption physical properties. Particularly, in the above-described range, it is suitable to implement the $S_e/r$ value of the present disclosure obtained by modeling free-swelling capacity (g/g) values over time(s) with respect to water having an electrical conductivity of 100 μS/cm to 130 μS/cm using Equation 1 above to be within a desired range.

In addition, the surface cross-linked layer may be formed by adding an inorganic material to the surface cross-linking agent. That is, in the presence of the surface cross-linking agent and the inorganic material, the surface cross-linked layer may be formed by further cross-linking the surface of the base polymer powder.

As the above-described inorganic material, one or more inorganic materials selected from the group consisting of silica, clay, alumina, a silica-alumina composite, titania, a zinc oxide, and an aluminum sulfate may be used. The above-described inorganic material may be used in a powder form or a liquid form, and particularly, may be used as alumina powder, silica-alumina powder, titania powder, or a nano-silica solution. In addition, the inorganic material may be used in an amount of about 0.001 parts by weight to about 1 part by weight based on 100 parts by weight of super absorbent polymer particles.

As described above, by controlling the $S_e/r$ value of the present disclosure obtained by modeling free-swelling capacity (g/g) values over time(s) with respect to water having an electrical conductivity of 100 μS/cm to 130 μS/cm using Equation 1, which is the parameter of the present disclosure described above, the super absorbent polymer including the base polymer powder and the surface cross-linked layer formed on the base polymer powder may absorb discharged body fluids at a high speed when applied to a hygiene product such as a diaper, and may also absorb a relatively large amount thereof in the beginning, and thus, may prevent a problem such as accumulation of body fluids inside the hygiene product or leakage thereof to the outside.

II. Method for Preparing Super Absorbent Polymer

Meanwhile, a typical super absorbent polymer is prepared in the presence of an internal cross-linking agent and a polymerization initiator by cross-linking polymerizing a water-soluble ethylene-based unsaturated monomer to form a hydroxyl gel polymer, drying the hydroxyl gel polymer thus formed, and then pulverizing the same to a desired particle size, and typically, at this time, in order to facilitate the drying of the hydroxyl gel polymer, and to increase the efficiency of the pulverization process, a chopping process is performed in which the hydroxyl gel polymer is cut into particles having a size of several millimeters prior to the drying process. However, in the above-described chopping process, due to the adhesiveness of the hydrogel polymer, the hydrogel polymer is not pulverized to a micro-size particle level and becomes an aggregated gel form. When the hydrogel polymer in the form of the aggregated gel is dried, a plate-shaped dry body is formed, and in order to pulverize the same to a micro-size particle level, a pulverization process may be performed to reduce the adhesiveness of the multi-stage polymer, wherein there has been a problem in which a large amount of fine powder is generated in the process.

Specifically, a typical super absorbent polymer has been prepared by the following steps.

(Neutralization) neutralizing at least a portion of an acid group of a water-soluble ethylene-based unsaturated monomer.

(Polymerization) cross-linking polymerizing, in the presence of an internal cross-linking agent and a polymerization initiator, the water-soluble ethylene-based unsaturated monomer having the acid group at least partially neutralized to form a hydrogel polymer.

(Chopping) chopping the hydrogel polymer.

(Drying) drying the chopped hydrogel polymer.

(Pulverization/Classification) pulverizing the dried polymer and classifying the same into normal particles and fine powder.

As described above, the chopped hydrogel polymer has the form of aggregated gel of about 1 cm to about 10 cm in size, and the chopped hydrogel polymer is stacked on a belt formed of a perforated plate, and then dried by hot air supplied from the top or the bottom. Since the polymer dried by the above-described drying method exhibits a plate shape rather than a particle shape, the pulverization followed by the classification has been performed in steps of performing coarse pulverization and then classification such that prepared particles become normal particles, that is, particles having a particle diameter of 150 μm to 850 μm, and then performing find pulverization and then classification thereon. Since the amount of fine powder separated in a final classification step by the above-described preparation method is as large as about 20 wt % to about 30 wt % based on the total weight of a finally prepared super absorbent polymer, the separated fine powder has been reused by being mixed with an appropriate amount of water to be re-assembled, and then being introduced in a step before the chopping step or the drying step.

However, when the fine powder re-assembled body mixed with water for reuse of the fine powder is re-introduced in the pulverization or drying process, there has been a problem of causing an increase in equipment load and/or energy usage, and degradation in the physical properties of a super absorbent polymer has been caused due to remaining fine powder that has not been classified.

As a result of repeated research for solving the above-described problem, it has been confirmed that, instead of performing polymerization in a state in which an acid group of a water-soluble ethylene-based unsaturated monomer is neutralized as in a typical method for preparing a super absorbent polymer, if polymerization is first performed to form a polymer in a state in which an acid group is not neutralized, and the hydrogel polymer is micronized in the presence of a surfactant, followed by neutralizing an acid group of the polymer, the acid group of the polymer is neutralized to form a hydrogel polymer, and then the hydrogel polymer is micronized in the presence of a surfactant, or the acid group present in the polymer is neutralized at the same time as micronization, the surfactant is present in a large amount on the surface of the polymer, and is allowed to sufficiently serve to lower high adhesiveness of the polymer, thereby preventing the polymer from being excessively aggregated, and to control the aggregation status to a desired level.

At this time, if ultra-fine pulverization is performed by applying high-intensity mechanical shearing force in the micronization step, it is possible to form aggregated hydrogel particles having finer micropores.

The hydrogel polymer prepared by the ultra-fine pulverization performed by applying the high-intensity mechanical shearing force is prepared in the form of particles having stable micropores of 100 μm or less, and then subjected to pulverization and drying processes later under milder conditions, so that it is possible to further reduce the amount of fine powder generated during the processes.

In addition, through the ultra-fine pulverization process using the high-intensity mechanical shearing force, it is possible to form micropores in the hydrogel polymer without using a separate foaming agent in the polymerization step, so that the absorption speed is also improved, and accordingly, it is easy to control the above-described $S_e/r$ value of the present disclosure obtained by modeling free-swelling capacity (g/g) values over time(s) with respect to water having an electrical conductivity of 100 μS/cm to 130 μS/cm using Equation 1 above to be within a desired range.

Meanwhile, preferably, the hydrogel micronization process may be performed in the presence of a surfactant. By using a surfactant in the micronization step, the aggregation of particles may be effectively controlled, and accordingly, the productivity may be further improved by lowering the load of a device.

In addition, when a polymer is formed by performing polymerization first in an unneutralized state, and then an acid group present in the polymer is neutralized, it is possible to form a polymer having a longer chain, so that an effect of reducing the content of extractable contents present in a uncross-linked state due to incomplete cross-linking may be achieved.

Since the extractable contents are easily eluted when the super absorbent polymer comes in contact with a liquid, if the content of the extractable contents is high, most of eluted extractable contents remain on the surface of the super absorbent polymer and make the super absorbent polymer sticky, thereby causing the decrease in permeability. Therefore, in terms of permeability, it is important to keep the content of extractable contents low.

According to an aspect of the present disclosure, since the polymerization is performed in the unneutralized state, the content of extractable contents is lowered, so that the permeability of the super absorbent polymer may be improved, and accordingly, it has been confirmed that it is easy to control the $S_e/r$ value obtained by modeling free-swelling capacity (g/g) values over time(s) with respect to water having an electrical conductivity of 100 μS/cm to 130 μS/cm using Equation 1 above to be within a desired range.

Hereinafter, a method for preparing a super absorbent polymer according to one aspect will be described in more detail for each step.

Step 1: Polymerization Step

First, polymerization is performed on a monomer composition including a water-soluble ethylene-based unsaturated monomer having an acid group and an internal cross-linking agent to prepare base polymer powder in which the water-soluble ethylene-based unsaturated monomer having an acid group and the internal cross-linking agent are cross-linking polymerized.

The above-described step may include mixing the water-soluble ethylene-based unsaturated monomer having and acid group, the internal cross-linking agent, and a polymerization initiator to prepare a monomer composition and polymerizing the monomer composition to form a polymer.

Here, the same contents described with reference to the super absorbent polymer of Item I above may be equally applied to each component.

Meanwhile, the water-soluble ethylene-based unsaturated monomer has an acid group. As described above, in the preparation of a typical super absorbent polymer, the monomer in which at least a portion of an acid group has been neutralized by a neutralizing agent is cross-linked to form a polymer. Specifically, in the step of mixing the water-soluble ethylene-based unsaturated monomer having an acid group, the internal cross-linking agent, the polymerization initiator, and the neutralizing agent, at least a portion of the acid group of the water-soluble ethylene-based unsaturated monomer has been neutralized.

However, according to an aspect of the present disclosure, a polymer is formed by performing polymerization first in a state in which the acid group of the water-soluble ethylene-based unsaturated monomer is not neutralized.

The water-soluble ethylene-based unsaturated monomer (e.g., acrylic acid) in a state in which the acid group is not neutralized is in a liquid state at room temperature and has high miscibility with a solvent (water), thereby being present in a mixed solution state in a monomer composition. However, the water-soluble ethylene-based unsaturated monomer in which the acid group is neutralized is in a solid state at room temperature, has different solubility depending on the temperature of a solvent (water), and has lower solubility as a lower temperature.

The water-soluble ethylene-based unsaturated monomer in which the acid group is not neutralized has higher solubility or miscibility with respect to a solvent (water) than a monomer in which an acid group is neutralized, and thus, is not precipitated even at a low temperature, and accordingly, is advantageous in long-term polymerization at a low temperature. Accordingly, it is possible to stably form a polymer having a higher molecular weight and a uniform molecular weight distribution by performing long-term polymerization using the water-soluble ethylene-based unsaturated monomer in a state in which the acid group is not neutralized.

In addition, it is possible to form a polymer with a longer chain, so that an effect of reducing the content of extractable contents present in a uncross-linked state due to incomplete polymerization or cross-linking may be achieved, and accordingly, it is suitable to implement the $S_e/r$ value of the present disclosure obtained by modeling free-swelling capacity (g/g) values over time(s) with respect to water having an electrical conductivity of 100 μS/cm to 130 μS/cm using Equation 1 above to be within a desired range.

In addition, as described above, if polymerization is first performed to form a polymer in a state in which an acid group of a monomer is not neutralized, and the polymer is neutralized, and then micronized in the presence of a surfactant, micronized in the presence of a surfactant and then polymerized, or micronized simultaneously with neutralizing an acid group present in the polymer, the surfactant is present in a large amount on the surface of the polymer to sufficiently serve to lower the adhesiveness of the polymer.

According to an aspect of the present disclosure, the step of performing polymerization on the monomer composition to form a polymer may be performed for 1 hour or more in a batch-type reactor.

In a typical method for preparing a super absorbent polymer, the polymerization method is largely divided into thermal polymerization and photopolymerization depending on a polymerization energy source, and typically, the thermal polymerization may be performed in a reactor with a stirring shaft such as a kneader, and the photopolymerization may be performed in a flat-bottomed vessel.

Meanwhile, if the polymerization is performed as continuous polymerization, for example, if polymerization is performed in a reactor having a conveyor belt, a new monomer composition is supplied to the reactor as a polymerization product moves, thereby achieving polymerization in a continuous manner, so that polymers having different polymerization rates are mixed, and accordingly, it is difficult to achieve even polymerization in the entire monomer composition, which may cause degradation in the overall physical properties.

However, according to an aspect of the present disclosure, polymerization is performed in a stationary manner in a batch reactor, so that there is less risk of mixing polymers with different polymerization rates, and accordingly, a polymer having uniform quality may be obtained.

In addition, the above-described polymerization step is performed in a batch reactor having a predetermined volume, and performs a polymerization reaction for a long period of time, for example, 1 hour or more, 3 hours or more, or 6 hours or more, compared to a case in which polymerization is performed in a continuous manner in a reactor having a conveyor belt. Despite the long polymerization reaction time as described above, since polymerization is performed on a water-soluble ethylene-based unsaturated monomer in an unneutralized state, the monomer is not easily precipitated even when the polymerization is performed for a long period of time, and therefore, it is advantageous for long-term polymerization.

Meanwhile, the polymerization in a batch reactor of the present disclosure is performed by a thermal polymerization method, so that a thermal polymerization initiator is used as the polymerization initiator, and the description of the corresponding component is the same as described above.

Steps 2 to 3: Micronization and Neutralization Steps

Next, a step of micronizing the hydrogel polymer in the presence of a surfactant to prepare a mixture including the micronized hydrogel polymer (Step 2) is included.

The above-described micronization step is a step of micronizing the polymer in the presence of a surfactant, and is a step in which micronization and aggregation of the polymer into a size of tens to hundreds of micrometers are simultaneously performed, rather than chopping the polymer to a millimeter size.

That is, it is a step of imparting appropriate adhesiveness to the polymer, thereby preparing secondary aggregated particles in the shape in which primary particles micronized to a size of tens to hundreds of micrometers are aggregated. Hydrous super absorbent polymer particles, which are the secondary aggregated particles prepared in the above-described step have a normal particle size distribution and a greatly increased surface area, so that the absorption speed may be significantly improved.

Meanwhile, if ultra-fine pulverization is performed at a rotation speed of 500 rpm to 4,000 rpm by applying high-intensity mechanical shearing force in the micronization step, it is possible to form aggregated hydrogel particles having finer micropores.

At this time, if ultra-fine pulverization is performed at a rotation speed of 500 rpm to 4,000 rpm, high-intensity mechanical shearing force is applied, so that micropores of 100 μm or less are easily formed on the polymer, and accordingly, the surface roughness is increased, and the total surface area of the polymer is significantly increased by the pores formed inside and outside the polymer particles. Since the micropores are formed in a shape having stability compared to pores formed using a foaming agent in the polymerization step, the degree of fine powder generation due to the corresponding pores may be significantly reduced in the following process. Super absorbent polymer particles prepared in the above-described step have a significantly increased surface area, so that the absorption speed may be significantly improved, and accordingly, it is suitable to implement the $S_e/r$ value of the present disclosure obtained by modeling free-swelling capacity (g/g) values over time(s) with respect to water having an electrical conductivity of 100 μS/cm to 130 μS/cm using Equation 1 above to be within a desired range.

The ultra-fine pulverization process is performed at a rotation speed of 500 rpm to 4,000 rpm, and if the rotation speed of the above-described process is less than 500 rpm, it is difficult to form sufficient pores to a desired degree, so that it is difficult to expect quick absorption speed, and it is difficult to secure a desired level of productivity. In addition, if the rotation speed is more than 4,000 rpm, polymer chains may be damaged due to excessive shearing force, and accordingly, the content of extractable contents is increased, so that overall physical properties of a prepared super absorbent polymer may be slightly degraded. Preferably, the ultra-fine pulverization process may be performed at 1,000 rpm to 3,500 rpm, or 2,000 rpm to 3,000 rpm. In the above-described range, it is easy to form desired micropores without any problem described above.

According to an aspect of the present disclosure, the micronization step is performed by a micronization device, and the micronization device may include a body part having a transfer space thereinside, in which a polymer is transferred, a screw member rotatably installed inside the transfer space to move a polymer, a drive motor providing a rotational driving force to the screw member, a cutter member installed in the body part and pulverizing the polymer, and a perforated plate discharging the polymer pulverized by the cutter member to the outside of the body part and having a plurality of holes.

At this time, the size of the hole provided in the perforated plate of the micronization device may be 1 mm to 25 mm, 5 mm to 20 mm, or 5 mm to 15 mm.

As described above, when the polymer mixed with the surfactant is micronized using the micronization device while controlling aggregation, a smaller particle size distribution is implemented, so that the following drying and pulverization processes may be performed under milder conditions, and accordingly, it is possible to improve the physical properties of the super absorbent polymer while preventing the generation of fine powder, and if the ultra-fine pulverization is performed, appropriate micropores are simultaneously formed on the surface of the polymer, so that absorption speed may be improved through the improvement in the surface area.

The micronization step may be performed one or more times, and preferably, may be performed 1 time to 6 times, 1 time to 4 times, or 1 time to 3 times. The above-described step may be performed using a plurality of micronization devices, or may be performed using a single micronization device including a plurality of perforated plates and/or a plurality of cutter members, or some devices of the plurality of micronization devices may include a plurality of perforated plates and/or a plurality of cutter members.

According to an aspect of the present disclosure, a surfactant may be additionally used in the above-described micronization step, and accordingly, aggregation between polymer particles may be effectively controlled to lower the load of the device used in the pulverization process, so that productivity may be further improved.

Preferably, the surfactant may be a compound represented by Formula 2 below or a salt thereof, but the present disclosure is not limited thereto.

[Formula 2]

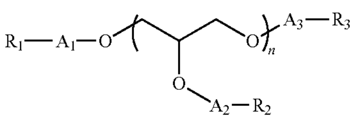

In Formula 2 above, $A_1$, $A_2$, and $A_3$ are each independently a single bond, carbonyl,

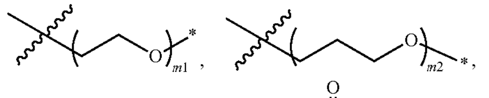

or

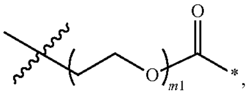

but one or more thereof is carbonyl or

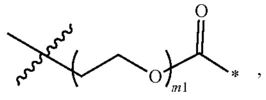

, wherein m1, m2, and m3 are each independently an integer of 1 to 8,

is connected to each of adjacent oxygen atoms, and -* is connected to each of adjacent $R_1$, $R_2$, and $R_3$, $R_1$, $R_2$, and $R_3$ are each independently hydrogen, a linear-chain or branched-chain alkyl having 6 to 18 carbon atoms, or a linear-chain or branched-chain alkenyl having 6 to 18 carbon atoms, and n is an integer of 1 to 9.

The surfactant is mixed with the polymer and added such that the micronization step is facilitated without aggregation.

The surfactant represented by Formula 2 above is a nonionic surfactant, and has excellent surface adsorption performance by hydrogen binding force even with an unneutralized polymer, and thus, is suitable to implement a desired aggregation control effect. On the other hand, in the case of an anionic surfactant, not a nonionic surfactant, when mixed with a polymer neutralized with a neutralizing agent such as NaOH and $Na_2SO_4$, the anionic surfactant is adsorbed using $Na^+$ ions ionized in a carboxyl group substituent of the polymer as a medium, and when mixed with a unneutralized polymer, there is a problem in that the adsorption efficiency with respect to the polymer is relatively degraded due to competition with anions of a carboxyl group substituent of the polymer.

Specifically, in the surfactant represented by Formula 2 above, a hydrophobic functional group is a $R_1$, $R_2$, or $R_3$ part (if not hydrogen), which is a terminal functional group, and a hydrophilic functional group further includes a glycerol-derived part in the chain, and a hydroxyl group at the terminal (if $A_n$ is a single bond, and at the same time, $R_n$ is hydrogen, n=1 to 3), wherein the glycerol-derived part and the hydroxyl group at the terminal are hydrophilic functional groups, which serve to improve adsorption performance with respect to the polymer surface. Accordingly, it is possible to effectively suppress aggregation of super absorbent polymer particles.

In Formula 2 above, $R_1$, $R_2$, and $R_3$ parts (if not hydrogen), which are hydrophobic functional groups, are each independently a linear-chain or branched-chain alkyl having 6 to 18 carbon atoms, or a linear-chain or branched-chain alkenyl having 6 to 18 carbon atoms. At this time, if $R_1$, $R_2$, or $R_3$ part (if not hydrogen) is alkyl or alkenyl having less than 6 carbon atoms, there is a problem in that aggregation of pulverized particles is not effectively controlled due to a short chain length, and if $R_1$, $R_2$, or $R_3$ part (if not hydrogen) is alkyl or alkenyl having more than 18 carbon atoms, the mobility of the surfactant is reduced, and thus, the surfactant may not be effectively mixed with the polymer, and due to an increase in the cost of the surfactant, there may be a problem in that the unit cost of the composition increases.

Preferably, $R_1$, $R_2$, or $R_3$ is hydrogen, or in the case of a linear-chain or branched-chain alkyl having 6 to 18 carbon atoms, it may be 2-methylhexyl, n-heptyl, 2-methylheptyl, n-octyl, n-nonyl, n-decanyl, n-undecanyl, n-dodecanyl, n-tridecanyl, n-tetradecanyl, n-pentadecanyl, n-hexadecanyl, n-heptadecanyl, or n-octadecanyl, or in the case of a linear-chain or branched-chain alkenyl having 6 to 18 carbon atoms, it may be 2-hexenyl, 2-heptenyl, 2-octenyl, 2-nonenyl, n-dekenyl, 2-undekenyl, 2-dodekenyl, 2-tridekenyl, 2-tetradekenyl, 2-pentadekenyl, 2-hexadekenyl, 2-heptadekenyl, or 2-octadekenyl.

The surfactant may be selected from compounds represented by Formula 2-1 to Formula 2-14 below.

[Formula 2-1]

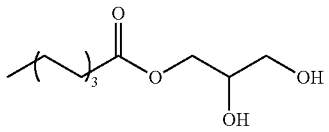

[Formula 2-2]

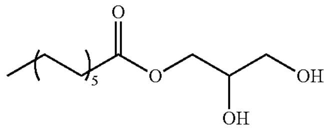

[Formula 2-3]

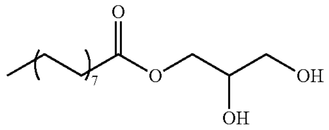

[Formula 2-4]

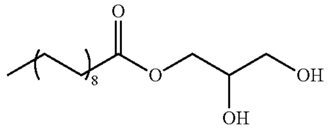

[Formula 2-5]

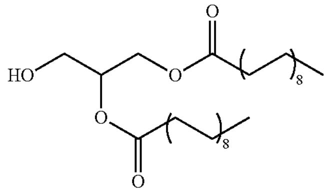

[Formula 2-6]

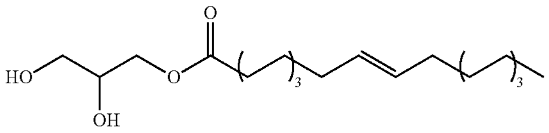

[Formula 2-7]

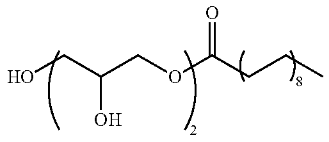

[Formula 2-8]

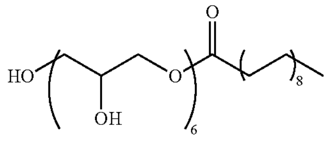

[Formula 2-9]

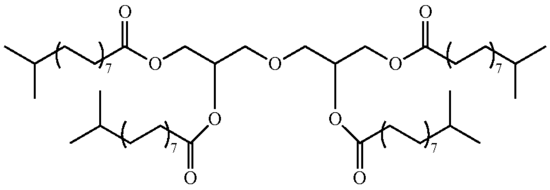

-continued

[Formula 2-10]

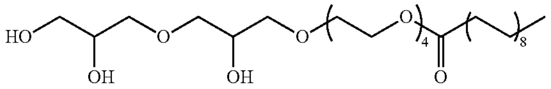

[Formula 2-11]

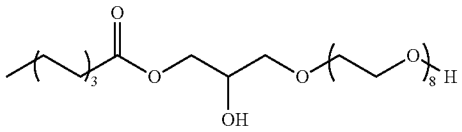

[Formula 2-12]

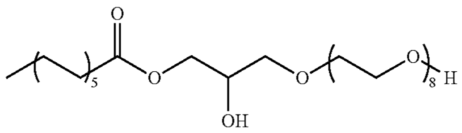

[Formula 2-13]

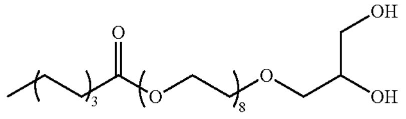

[Formula 2-14]

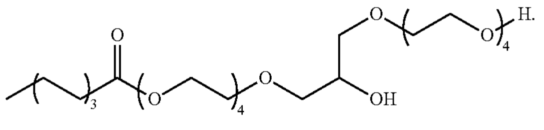

Meanwhile, the amount of the surfactant to be used is not particularly limited, but the surfactant may be used in an amount of 0.06 g to 0.48 g per 1,000 g of the hydrogel polymer depending on productivity securing or the load of a device.

If the surfactant is used too little, the surfactant is not evenly adsorbed onto the surface of the polymer, so that particles may re-aggregated after pulverization, or due to much sharing between the surfactant and the polymer, absorption performance such as centrifuge retention capacity and absorbency under pressure may be degraded. Meanwhile, if the surfactant is used too much, due to a decrease in surface tension, the overall physical properties of a finally prepared super absorbent polymer may be degraded.

Therefore, for example, the surfactant may be used in an amount of 0.06 g or more, 0.1 g or more, or 0.2 g or more, and 0.48 g or less, 0.45 g or less, or 0.4 g or less per 1,000 g of the hydrogel polymer, and accordingly, it is easy to control the above-described $S_e/r$ value of the present disclosure obtained by modeling free-swelling capacity (g/g) values over time(s) with respect to water having an electrical conductivity of 100 μS/cm to 130 μS/cm using Equation 1 above to be within a desired range.

A method for mixing a surfactant with a polymer is not particularly limited as long as it is a method capable of evenly mixing the surfactant with the polymer, and may be appropriately adopted and used. Specifically, the surfactant may be mixed in a dry manner, or dissolved in a solvent and then mixed in a solution state, or the surfactant may be melted and then mixed.

Among the above, the surfactant may be, for example, mixed in a solution state of being dissolved in a solvent. At this time, as the solvent, all types of solvents may be used whether it is an inorganic solvent or organic solvent, but considering the ease of a drying process and the cost of a solvent recovery system, water is most suitable. In addition, the solution may be prepared by mixing the surfactant and the polymer in a reaction tank, putting the polymer in a mixer and spraying the solution thereon, or mixing the polymer and the solution by continuously supplying the same to a continuously operating mixer.

Meanwhile, if the surfactant is mixed in a solution state of being dissolved in water, the surfactant may be diluted as an aqueous solution having a concentration of about 0.01% to 10% and used.

For example, if the surfactant is to be used in an amount of 0.1 g per 1,000 g of the hydrogel polymer, 100 g of an aqueous solution having a concentration of 0.1% may be used by dissolving 0.1 g of the surfactant in 99.9 g of water. Alternatively, 10 g of an aqueous solution having a concentration of 1% may be used by dissolving 0.1 g of the surfactant in 9.9 g of water.

That is, if the same amount of the surfactant is used, the water content may be adjusted to prepare an aqueous solution with a desired concentration, and the concentration may be appropriately adjusted in consideration of the physical properties of a super absorbent polymer to be finally prepared.

Meanwhile, if the surfactant is hydrophobic, and thus, has very low solubility with respect to water, the surfactant may be mixed with the polymer in a dry manner, or the surfactant may be added to water such that the surfactant is used in a state of being dispersed in water. For example, if the surfactant is dry-mixed in a powder form and dispersed in the polymer, the degree of dispersion is very low, so that the surfactant may be used by being dispersed in water to be evenly coated on the surface.

According to an aspect of the present disclosure, a step of neutralizing at least a portion of the acid group of the polymer (Step 3) is performed, and the above-described micronization of Step 2 and the neutralization of Step 3 may be performed sequentially, alternately, or simultaneously.

That is, a neutralizing agent may be introduced to a polymer to polymerize the acid group first, and then a surfactant may be introduced to the polymerized polymer to micronize the polymer mixed with the surfactant (perform in the order of Step 3→Step 2), or a neutralizing agent and a surfactant may be simultaneously introduced to a polymer to neutralize and micronize the polymer (simultaneously perform Steps 2 and Step 3). Alternatively, a surfactant may be introduced first and then a neutralizing agent may be introduced later (perform in the order of Step 2→Step 3). Alternatively, a neutralizing agent and a surfactant may be alternately introduced. Alternatively, a surfactant may be introduced first for micronization, and then a neutralizing agent may be introduced for neutralization, and additionally, a surfactant may be further added to the neutralized hydrogel polymer to further perform the micronization process.

Here, if the neutralization is separately performed independently from the micronization of Step 2, the neutralization may be performed in such a manner that an additive is introduced while the polymer is being pulverized. More specifically, a screw-type extruder including a perforated plate having a plurality of holes may be used. The screw-type extruder is a device in which pulverization is performed in a mild condition compared to the micronization device used in the micronization step described above, and the rotation speed of the extruder may be about 150 rpm to about 500 rpm, and the hole of the perforated plate may be about 3 mm to 25 mm in size, but the present disclosure is not limited thereto.

The rotational speed of the screw-type extruder and the hole size of the perforated plate affect the discharge state of a super absorbent polymer discharged from the extruder, and depending on the discharge state, the particle shape of the super absorbent polymer may change.

Particularly, by adjusting the rotation speed of the screw-type extruder at 150 rpm to 500 rpm, it is possible to control the above-described $S_e/r$ value of the present disclosure obtained by modeling free-swelling capacity (g/g) values over time(s) with respect to water having an electrical conductivity of 100 μS/cm to 130 μS/cm using Equation 1 above to be within a desired range.

At this time, as the neutralizing agent, a basic material such as sodium hydroxide, potassium hydroxide, ammonium hydroxide, or the like, which is capable of neutralizing an acid group, may be used.

In addition, the degree of neutralization, which refers to the degree of neutralization of an acid group included in the polymer by the neutralizing agent may be 50 mol % to 90 mol %, 60 mol % to 85 mol %, 65 mol % to 85 mol %, or 65 mol % to 80 mol %. The range of the degree of neutralization may vary depending on final physical properties, and by adjusting the degree of neutralization, it is possible to adjust absorption speed and absorption performance.

At this time, if the degree of neutralization is too high, the absorbency of the super absorbent polymer may decrease, and the concentration of the carboxyl group on the surface of the particle is too low, making it difficult to properly perform surface cross-linking in a subsequent process, so that absorption properties under pressure or permeability may be reduced. On the other hand, if the degree of neutralization is too low, the polymer may have significantly reduced absorption power, and may exhibit the same property as that of elastic rubber, which is difficult to handle.

Meanwhile, in order to neutralize the entire polymer evenly, it may be preferable to leave a certain time lag between the introduction of the neutralizing agent and the micronization process.

Step 4: Drying Step

Next, a step (Step 4) of drying the micronized and neutralized polymer to prepare base polymer powder is performed.

The above-described step is a step in which at least a portion of an acid group of a polymer is neutralized, and moisture of the base polymer powder, which is a polymer obtained by micronizing the polymer, is dried.

In a typical method for preparing a super absorbent polymer, the drying step is performed such that the moisture content of base polymer powder is to be about 4 wt % to 20 wt %, about 4 wt % to about 15 wt %, or about 6 wt % to about 13 wt %. However, the present disclosure is not limited thereto.

Step 4 above may be performed by fixed-bed type drying, moving type drying, or a combination thereof.

According to an aspect of the present disclosure, Step 4 above may be performed by fixed-bed type drying.

The fixed-bed type drying refers to a method in which a material to be dried is suspended on a floor such as a perforated iron plate which allows air to pass through, and then hot air passes through the material from the bottom to the top to dry the material.

The fixed-bed type drying performs drying in a plate-shape manner without the flow of particles, so that it is difficult to achieve uniform drying with a simple flow of hot air. Therefore, the fixed-bed type drying requires a delicate control of hot air and temperature in order to obtain a dry body with a uniform high moisture content. In the present disclosure, through a method of changing the direction of hot air from downward to upward, a plate-shaped dry body is prevented from bending during drying, thereby preventing the hot air from escaping. In addition, the drying temperature was changed for each section to control the upper layer-middle layer-lower layer inside the dry body to be uniformly dried with a moisture content deviation of 5% or less.

As a device capable of performing drying by the fixed-bed type drying, a belt-type dryer or the like may be used, but the present disclosure is not limited thereto.

In the case of the fixed-bed type drying step, the drying process may be performed at a temperature of about 80° C. to about 200° C., preferably 90° C. to 190° C. or 100° C. to 180° C. If the drying temperature is below 80° C., the drying time may become excessively long, and if the drying temperature is excessively high, which is above 200° C., a super absorbent polymer having a moisture content lower than a desired moisture content may be obtained. Meanwhile, the drying temperature may mean the temperature of hot air which is used or the internal temperature of a device during the drying process.

According to an aspect of the present disclosure, Step 4 above may be performed by moving type drying.

The moving type drying refers to a method of drying a dry body by mechanically stirring the same during drying. At this time, the direction in which hot air passes through a material may be the same as or different from the circulation direction of the material. Alternatively, the material may be dried by circulating inside a dryer and passing through a heat medium fluid (heat oil) from a separate pipe outside the dryer.

As a device capable of performing drying by the above-described moving type drying, a horizontal-type mixer, a rotary kiln, a paddle dryer, a steam tube dryer, a moving type drier commonly used, or the like may be used.

In the case of the moving type drying step, the drying process may be performed at a temperature of about 100° C. to about 300° C., preferably 120° C. to 280° C. or 150° C. to 250° C. If the drying temperature is excessively low, which is below 100° C., the drying time may become excessively long, and if the drying temperature is excessively high, which is above 300° C., super absorbent polymer chains may be damaged, which may degrade the overall physical properties, and also, a super absorbent polymer having a moisture content lower than a desired water content may be obtained.

Step 5: Pulverization Step

Next, a step of pulverizing the dried base polymer powder is performed.

Specifically, the pulverization step may be performed by pulverizing the dry base polymer powder to have a particle size of normal particle level, i.e., a particle diameter of 150 μm to 850 μm.

A pulverizer to be used for the above-described purpose may specifically be a vertical pulverizer, a turbo cutter, a turbo grinder, a rotary cutter mill, a cutter mill, a disc mill, a shred crusher, a crusher, a chopper, a disc cutter, or the like, but is not limited to the above-described examples.

Alternatively, as the pulverizer, a pin mill, a hammer mill, a screw mill, a roll mill, a disc mill, a jog mill, or the like may be used, but the pulverizer is not limited to the above-described examples.

Meanwhile, in the preparation method of the present disclosure, super absorbent polymer particles having a small particle size distribution may be implemented in the micronization step compared to a typical chopping step, and since the moisture content is maintained relatively high after drying, even if pulverization is performed under mild conditions with relatively low pulverization power, a super absorbent polymer having a very high content of particles with a normal particle size of 50 μm to 850 μm may be obtained, and the fine powder generation rate may be greatly reduced.

The super absorbent polymer particles prepared as described above may include super absorbent polymer particles having a particle size of 150 μm to 850 μm, i.e., normal particles, in an amount of 80 wt % or more, 85 wt % or more, 89 wt % or more, 90 wt % or more, 92 wt % or more, 93 wt % or more, 94 wt % or more, or 95 wt % or more based on the total weight. The particle size of the above-described polymer particles may be measured according to the method of EDANA WSP 220.3 of the European Disposables and Nonwovens Association (EDANA) standards.

In addition, the super absorbent polymer particles may contain fine powder having a particle diameter of less than 150 μm in an amount of about 20 wt % or less, about 18 wt % or less, about 15 wt % or less, about 13 wt % or less, about 12 wt % or less, about 11 wt % or less, about 10 wt % or less, about 9 wt % or less, about 8 wt % or less, or about 5 wt % or less based on the total weight. This is in contrast to having fine powder in an amount of more than about 20 wt % to about 30 wt % when a super absorbent polymer is prepared according to a typical preparation method.

Additive Introduction Step

Meanwhile, according to an aspect of the present disclosure, prior to the drying step (Step 4), a step of introducing an additive to the micronized and neutralized polymer may be further included.

The process of introducing an additive is a process for improving physical properties by using an additional additive within a range in which a desired effect is not inhibited, and the type of the additive is not particularly limited, wherein, for example, a polymerization initiator for removing residual monomers, a permeability enhancer for improving absorption properties, a fine powder anti-caking agent for recirculating generated fine powder, a fluidity enhancer, an antioxidant, a neutralizing agent, a surfactant, and the like may be used, but the additive is not limited thereto.

The additive introduction step may be performed simultaneously with Step 2, simultaneously with Step 3, after Step 2 and Step 3, or in at least one of the above-described steps. The additive introduction step may be performed a plurality of times if necessary, and may also be performed one or more times in each step.

If the additive introduction step is separately performed independently from Step 2 and Step 3, that is, if performed after Step 2 and Step 3 and before Step 4, the additive introduction step may be performed in a manner in which an additive is introduced while the polymer is being pulverized.

The pulverization of Step 5 described above may be equally applied to the pulverization above, and in the pulverization step, an additive may be introduced once or a plurality of times and mixed with the polymer.

Classification Step

Next, after the step of pulverizing the base polymer powder (Step 5), a step of classifying the pulverized super absorbent polymer particles according to the particle size may be further included.

Surface Cross-Linking Step

In addition, a step of forming a surface cross-linked layer on at least a portion of the surface of the base polymer particle in the presence of a surface cross-linking agent after pulverizing (Step 5) and/or classifying the base polymer powder may be further included. By the above-described step, a cross-linked polymer included in the base polymer powder may be further cross-linked by means of the surface cross-linking agent, so that the surface cross-linked layer may be formed on at least a portion of the surface of the base polymer powder.

The same contents described above with reference to a surface cross-linking agent may be equally applied to the surface cross-linking agent.

In addition, there is no limitation on a method for mixing the surface cross-linking agent with the base polymer powder. For example, a method in which a composition including a surface cross-linking agent and base polymer powder is introduced into a reaction tank and mixed, a method in a surface cross-linking agent is sprayed on the composition, a method in which a polymer composition and a surface cross-linking agent are continuously supplied to a continuously operating mixer, and the like may be used.

When the surface cross-linking agent and the base polymer powder are mixed, water and methanol may be mixed together and additionally added thereto. If water and methanol are added, there is an advantage in that the surface cross-linking agent may be evenly dispersed in the polymer composition. At this time, the content of water and methanol added may be appropriately controlled to induce even dispersion of the surface cross-linking agent, to prevent aggregation of the polymer composition, and to optimize the surface penetration depth of the cross-linking agent.

The surface cross-linking process may be performed at a temperature of about 80° C. to about 250° C. More specifically, the surface cross-linking process may be performed at a temperature of about 100° C. to about 220° C., or about 120° C. to about 200° C. for about 20 minutes to about 2 hours, or about 40 minutes to about 80 minutes. When the above-described surface cross-linking process conditions are satisfied, the surface of the super absorbent polymer particles are sufficiently cross-linked, so that the absorbency under pressure may increase.

The means for raising the temperature for the surface cross-linking reaction is not particularly limited.

A heat medium may be supplied, or a heat source may be directly supplied for heating. At this time, the types of the heat medium that can be used may include steam, hot air, and a heated fluid such as hot oil, but are not limited thereto, and the temperature of a supplied heat medium may be appropriately selected in consideration of the means of the heat medium, the temperature raising rate, and the temperature raising target temperature. Meanwhile, the heat source that can be directly supplied may include heating through electricity, or heating through gas, but is not limited to the above-described examples.

Post-Treatment Step

According to an aspect of the present disclosure, after the step of forming the surface cross-linked layer on at least a part of the surface of the base polymer powder, the method may be performed by further including any one or more steps among a cooling step of cooling the super absorbent polymer particles having the surface cross-linking layer formed thereon, an adding-water step of adding water to the super absorbent polymer particles having the surface cross-linked layer formed thereon, and a post-treatment step of introducing an additive to the super absorbent polymer particles having the surface cross-linked layer formed thereon. At this time, the cooling step, the adding-water step, and the post-treatment step may be performed sequentially or simultaneously.

In the adding-water step, water or salt water may be used, through which the amount of remnants generated may be controlled. The amount of water to be used may be appropriately controlled in consideration of a desired moisture content of a final product, and preferably, the water may be used in an amount of 0.1 wt % to 10 wt %, 0.5 wt % to 8 wt %, or 1 wt % to 5 wt % based on the absorbent polymer, but is not limited thereto.

In addition, after the adding-water step, an aging step may be further performed.

If salt water is used in the adding-water step, due to the conductivity of the salt water, the solution absorption speed relatively decreases, which allows the salt water to evenly spread during the aging step, thereby making it possible to achieve even absorption with respect to the absorbent polymer. In the aging step, a commonly used method may be applied without particular limitation, and for example, the aging step may be performed at 100° C. or lower, 80° C. or lower, preferably at 50° C. or lower for 10 minutes to 1 hour using a rotary stirring facility.

The additive introduced in the post-treatment step may be a surfactant, an inorganic salt, a permeability enhancer, an anti-caking agent, a fluidity enhancer, an antioxidant, and the like, but the present disclosure is not limited thereto.

By selectively performing the cooling step, the adding-water step, and the post-treatment step, the moisture content of a final super absorbent polymer may be increased by controlling the generation of remnants, and a high-quality super absorbent polymer product may be prepared.

Hereinafter, through specific aspects of the present disclosure, actions and effects of the present disclosure will be described in more detail. However, these aspects are only presented as examples of the present disclosure, and the scope of the present disclosure is not limited thereby.

EXAMPLES

Example 1

(Step 1: Polymer Preparation Step)

In a 5 L glass container equipped with a stirrer and a thermometer, 1500 g of acrylic acid, and as an internal cross-linking agent, 3.0 g of pentaerythritol triallyl ether (PETTAE) and 0.75 g of trimethyllolpropane triacrylate (TMPTA) (product name: M3190, manufacturer: Miwon), and 3406 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.8 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

20 g of 0.45 wt % glycerol monolaurate (GML) aqueous solution was added to 1,000 g of the polymer obtained in Step 1 above. Thereafter, using a high-speed rotating micronizer (F-150/Karl Schnell Co.) mounted inside a cylindrical pulverizer, the mixture was pushed into a perforated plate with a plurality of 10 mm holes at a rotation speed of 2,000 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 400 g of 32% NaOH aqueous solution (Step 3: neutralization step) was introduced to neutralize a portion of an acid group of the polymer, and then 100 g of fine powder (additional additive introduction step) and 35.5 g of 5% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a mill (GRAN-U-LIZER™, MPE) with a mill roll gap of 0.12 mm, and then classified using a standard mesh sieve of ASTM standards to obtain base polymer powder having a size of 150 μm to 850 μm.

(Surface Cross-Linking Process)

Next, per 100 g of the base polymer powder, a surface cross-linking agent aqueous solution containing 4 g of water, 6 g of methanol, 0.05 g of ethylene glycol diglycidyl ether (EJ-1030S), 0.1 g of propylene glycol, and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking process, the surface cross-linked super absorbent polymer was classified using a standard mesh sieve of ASTM standards to prepare a super absorbent polymer having a particle diameter of 150 μm to 850 μm.

Example 2

(Step 1: Polymer Preparation Step)

A polymer was obtained in the same manner as in Example 1.

(Steps 2 to 3: Micronization and Neutralization Steps)

40 g of 0.45 wt % glycerol monolaurate (GML) aqueous solution was added to 1,000 g of the polymer obtained in Step 1 above. Thereafter, using a high-speed rotating micronizer (F-150/Karl Schnell Co.) mounted inside a cylindrical pulverizer, the mixture was pushed into a perforated plate with a plurality of 10 mm holes at a rotation speed of 2,500 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 150 rpm to perform an additional pulverization process. For each stage of the above-described screw-type extruder, 400 g of 32% NaOH aqueous solution (Step 3: neutralization step) was introduced to neutralize a portion of an acid group of the polymer, and then 100 g of fine powder (additional additive introduction step) and 35.5 g of 5% $Na_2SO_4$ aqueous solution (additional additive introduction step) were each introduced to prepare hydrous super absorbent polymer particles (=micronized and neutralized polymer).

(Step 4: Drying Step)

A polymer was dried in the same manner as in Example 1.

(Step 5: Pulverization and Classification Step)

Base polymer powder was obtained by performing pulverization and classification in the same manner as in Example 1.

(Surface Cross-Linking Step)

A surface cross-linked super absorbent polymer was obtained by performing a surface cross-linking reaction in the same manner as in Example 1.

After the above-described surface cross-linking process, the surface cross-linked super absorbent polymer was classified using a standard mesh sieve of ASTM standards to prepare a super absorbent polymer having a particle diameter of 150 μm to 850 μm.

Example 3

(Step 1: Polymer Preparation Step)

A polymer was obtained in the same manner as in Example 1, except that as an internal cross-linking agent, 3.75 g of pentaerythritol triallyl ether (PETTAE) was used instead of 3.0 g of pentaerythritol triallyl ether (PETTAE) and 0.75 g of trimethylolpropane triacrylate (TMPTA).

(Steps 2 to 3: Micronization and Neutralization Steps)

40 g of 0.45 wt % glycerol monolaurate (GML) aqueous solution was added to 1,000 g of the polymer obtained in Step 1 above. Thereafter, using a high-speed rotating micronizer (F-150/Karl Schnell Co.) mounted inside a cylindrical pulverizer, the mixture was pushed into a perforated plate with a plurality of 10 mm holes at a rotation speed of 2,000 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 450 g of 32% NaOH aqueous solution (Step 3: neutralization step) was introduced to neutralize a portion of an acid group of the polymer, and then 100 g of fine powder (additional additive introduction step) and 35.5 g of 5% $Na_2SO_4$ aqueous solution (additional additive introduction step) were each introduced to prepare hydrous super absorbent polymer particles (=micronized and neutralized polymer).

(Step 4: Drying Step)

A polymer was dried in the same manner as in Example 1.

(Step 5: Pulverization and Classification Step)

The dried body was pulverized using a mill (GRAN-U-LIZER™, MPE) with a mill roll gap of 0.20 mm, and then classified using a standard mesh sieve of ASTM standards to obtain base polymer powder having a size of 150 μm to 850 μm.

(Surface Cross-Linking Step)

A surface cross-linked super absorbent polymer was obtained by performing a surface cross-linking reaction in the same manner as in Example 1.

After the above-described surface cross-linking process, the surface cross-linked super absorbent polymer was classified using a standard mesh sieve of ASTM standards to prepare a super absorbent polymer having a particle diameter of 150 μm to 850 μm.

Example 4

(Step 1: Polymer Preparation Step)

A polymer was obtained in the same manner as in Example 1.

(Steps 2 to 3: Micronization and Neutralization Steps)

30 g of 0.45 wt % glycerol monolaurate (GML) aqueous solution was added to 1,000 g of the polymer obtained in Step 1 above. Thereafter, using a high-speed rotating micronizer (F-150/Karl Schnell Co.) mounted inside a cylindrical pulverizer, the mixture was pushed into a perforated plate with a plurality of 10 mm holes at a rotation speed of 1,500 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 300 rpm to perform an additional pulverization process. For each stage of the above-described screw-type extruder, 400 g of 32% NaOH aqueous solution (Step 3: neutralization step) was introduced to neutralize a portion of an acid group of the polymer, and then 100 g of fine powder (additional additive introduction step) and 35.5 g of 5% $Na_2SO_4$ aqueous solution (additional additive introduction step) were each introduced to prepare hydrous super absorbent polymer particles (=micronized and neutralized polymer).

(Step 4: Drying Step)

A polymer was dried in the same manner as in Example 1.

(Step 5: Pulverization and Classification Step)

The dried body was pulverized using a mill (GRAN-U-LIZER™, MPE) with a mill roll gap of 0.18 mm, and then classified using a standard mesh sieve of ASTM standards to obtain base polymer powder having a size of 150 μm to 850 μm.

(Surface Cross-Linking Step)

A surface cross-linked super absorbent polymer was obtained by performing a surface cross-linking reaction in the same manner as in Example 1.

After the above-described surface cross-linking process, the surface cross-linked super absorbent polymer was classified using a standard mesh sieve of ASTM standards to prepare a super absorbent polymer having a particle diameter of 150 μm to 850 μm.

Example 5

(Step 1: Polymer Preparation Step)

A polymer was obtained in the same manner as in Example 1, except that as an internal cross-linking agent, 3.75 g of pentaerythritol triallyl ether (PETTAE) was used instead of 3.0 g of pentaerythritol triallyl ether (PETTAE) and 0.75 g of trimethylolpropane triacrylate (TMPTA).

(Steps 2 to 3: Micronization and Neutralization Steps)

20 g of 0.45 wt % glycerol monolaurate (GML) aqueous solution was added to 1,000 g of the polymer obtained in Step 1 above. Thereafter, using a high-speed rotating micronizer (F-150/Karl Schnell Co.) mounted inside a cylindrical pulverizer, the mixture was pushed into a perforated plate with a plurality of 10 mm holes at a rotation speed of 1,280 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 500 rpm to perform an additional pulverization process. For each stage of the above-described screw-type extruder, 350 g of 50% NaOH aqueous solution (Step 3: neutralization step) was introduced to neutralize a portion of an acid group of the polymer, and then 100 g of fine powder (additional additive introduction step) and 35.5 g of 5% $Na_2SO_4$ aqueous solution (additional additive introduction step) were each introduced to prepare hydrous super absorbent polymer particles (=micronized and neutralized polymer).

(Step 4: Drying Step)

A polymer was dried in the same manner as in Example 1.

(Step 5: Pulverization and classification step)

Base polymer powder was obtained by performing pulverization and classification in the same manner as in Example 1.

(Surface Cross-Linking Step)

A surface cross-linked super absorbent polymer was obtained by performing a surface cross-linking reaction in the same manner as in Example 1, except that 6 g of water was used per 100 g of the base polymer powder.

After the above-described surface cross-linking process, the surface cross-linked super absorbent polymer was classified using a standard mesh sieve of ASTM standards to prepare a super absorbent polymer having a particle diameter of 150 μm to 850 μm.

Comparative Example 1

(Step 1: Polymer Preparation Step)

In a 5 L glass container equipped with a stirrer and a thermometer, 1500 g of acrylic acid, and as an internal cross-linking agent, 5.0 g of pentaerythritol triallyl ether (PETTAE), and 3406 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.8 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

20 g of 0.45 wt % glycerol monolaurate (GML) aqueous solution was added to 1,000 g of the polymer obtained in Step 1 above. Thereafter, using a high-speed rotating micronizer (F-150/Karl Schnell Co.) mounted inside a cylindrical pulverizer, the mixture was pushed into a perforated plate with a plurality of 10 mm holes at a rotation speed of 500 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 400 g of 32% NaOH aqueous solution (Step 3: neutralization step) was introduced to neutralize a portion of an acid group of the polymer, and then 100 g of fine powder (additional additive introduction step) and 35.5 g of 5% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a mill (GRAN-U-LIZER™, MPE) with a mill roll gap of 0.12 mm, and then classified using a standard mesh sieve of ASTM standards to obtain base polymer powder having a size of 150 μm to 850 μm.

(Surface Cross-Linking Process)

Next, per 100 g of the base polymer powder, a surface cross-linking agent aqueous solution containing 4 g of water, 6 g of methanol, 0.05 g of ethylene glycol diglycidyl ether (EJ-1030S), 0.1 g of propylene glycol, and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking process, the surface cross-linked super absorbent polymer was classified using a standard mesh sieve of ASTM standards to prepare a super absorbent polymer having a particle diameter of 150 μm to 850 μm.

Comparative Example 2

(Step 1: Polymer Preparation Step)

In a 5 L glass container equipped with a stirrer and a thermometer, 1500 g of acrylic acid, and as an internal cross-linking agent, 3.0 g of pentaerythritol triallyl ether (PETTAE), and 3406 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.8 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

20 g of 0.45 wt % glycerol monolaurate (GML) aqueous solution was added to 1,000 g of the polymer obtained in Step 1 above. Thereafter, using a high-speed rotating micronizer (F-150/Karl Schnell Co.) mounted inside a cylindrical pulverizer, the mixture was pushed into a perforated plate with a plurality of 10 mm holes at a rotation speed of 500 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 380 g of 32% NaOH aqueous solution (Step 3: neutralization step) was introduced to neutralize a portion of an acid group of the polymer, and then 100 g of fine powder (additional additive introduction step) and 35.5 g of 5% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and classification step)

The dried body was pulverized using a mill (GRAN-U-LIZER™, MPE) with a mill roll gap of 0.12 mm, and then classified using a standard mesh sieve of ASTM standards to obtain base polymer powder having a size of 150 μm to 850 μm.

(Surface Cross-Linking Process)

Next, per 100 g of the base polymer powder, a surface cross-linking agent aqueous solution containing 4 g of water, 6 g of methanol, 0.05 g of ethylene glycol diglycidyl ether (EJ-1030S), 0.1 g of propylene glycol, and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking process, the surface cross-linked super absorbent polymer was classified using a standard mesh sieve of ASTM standards to prepare a super absorbent polymer having a particle diameter of 150 μm to 850 μm.

Comparative Example 3

(Step 1: Polymer Preparation Step)

In a 5 L glass container equipped with a stirrer and a thermometer, 1500 g of acrylic acid, and as an internal cross-linking agent, 2.0 g of pentaerythritol triallyl ether (PETTAE), and 3406 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.8 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

20 g of 0.45 wt % glycerol monolaurate (GML) aqueous solution was added to 1,000 g of the polymer obtained in Step 1 above. Thereafter, using a high-speed rotating micronizer (F-150/Karl Schnell Co.) mounted inside a cylindrical pulverizer, the mixture was pushed into a perforated plate with a plurality of 10 mm holes at a rotation speed of 500 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 500 rpm to perform an additional pulverization process. For each stage of the above-described screw-type extruder, 400 g of 32% NaOH aqueous solution (Step 3: neutralization step) was introduced to neutralize a portion of an acid group of the polymer, and then 100 g of fine powder (additional additive introduction step) and 35.5 g of 5% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a mill (GRAN-U-LIZER™, MPE) with a mill roll gap of 0.12 mm, and then classified using a standard mesh sieve of ASTM standards to obtain base polymer powder having a size of 150 μm to 850 μm.

(Surface Cross-Linking Process)

Next, per 100 g of the base polymer powder, a surface cross-linking agent aqueous solution containing 6 g of water, 6 g of methanol, 0.05 g of ethylene glycol diglycidyl ether (EJ-1030S), 0.1 g of propylene glycol, and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking process, the surface cross-linked super absorbent polymer was classified using a standard mesh sieve of ASTM standards to prepare a super absorbent polymer having a particle diameter of 150 μm to 850 μm.

Comparative Example 4

(Step 1: Polymer Preparation Step)

In a 5 L glass container equipped with a stirrer and a thermometer, 1500 g of acrylic acid, and as an internal cross-linking agent, 2.5 g of pentaerythritol triallyl ether (PETTAE) and 0.5 g of trimethyllolpropane triacrylate (TMPTA) (product name: M3190, manufacturer: Miwon), and 3406 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.8 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

15 g of 0.45 wt % glycerol monolaurate (GML) aqueous solution was added to 1,000 g of the polymer obtained in Step 1 above. Thereafter, using a high-speed rotating micronizer (F-150/Karl Schnell Co.) mounted inside a cylindrical pulverizer, the mixture was pushed into a perforated plate with a plurality of 10 mm holes at a rotation speed of 500 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 400 g of 32% NaOH aqueous solution (Step 3: neutralization step) was introduced to neutralize a portion of an acid group of the polymer, and then 100 g of fine powder (additional additive introduction step) and 35.5 g of 5% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a mill (GRAN-U-LIZER™, MPE) with a mill roll gap of 0.12 mm, and then classified using a standard mesh sieve of ASTM standards to obtain base polymer powder having a size of 150 μm to 850 μm.

(Surface Cross-Linking Process)

Next, per 100 g of the base polymer powder, a surface cross-linking agent aqueous solution containing 8 g of water, 6 g of methanol, 0.05 g of ethylene glycol diglycidyl ether (EJ-1030S), 0.1 g of propylene glycol, and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking process, the surface cross-linked super absorbent polymer was classified using a standard mesh sieve of ASTM standards to prepare a super absorbent polymer having a particle diameter of 150 μm to 850 μm.

EXPERIMENTAL EXAMPLES

The super absorbent polymers prepared in Examples and Comparative Examples were evaluated for physical properties by the following methods and the results are shown in Table 1 below.

Unless otherwise indicated, all of the following physical properties were evaluated under constant temperature/humidity (23±1° C., and relative humidity of 50±10%).

A sample to be measured was left to stand under constant temperature/humidity conditions for 24 hours, and was evaluated for each physical property.

In addition, unless otherwise indicated, the evaluation of physical properties of a final surface cross-linked super absorbent polymer was performed on a polymer having a particle diameter of 150 μm to 850 μm classified using a sieve of ASTM standards.

(1) Free-Swelling Capacity $FSC_{110}$ Over Time in Water Having Electrical Conductivity of 110 μS/Cm The free-swelling capacity $FSC_{110}$ (g/g) over time in water having an super absorbent polymer electrical conductivity of 110 μS/cm of the super absorbent polymer of each of Examples and Comparative Examples was measured by the following method below.

1) First, 1.0 g $W_1$ of the super absorbent polymer was placed in a nonwoven fabric bag (18 cm×28 cm) and immersed in 1000 mL of water having an electrical conductivity value of 110 μS/cm at 24° C. for (10 seconds/20 seconds/30 seconds/60 seconds/120 seconds/300 seconds/600 seconds/1800 seconds).
2) After (10 seconds/20 seconds/30 seconds/60 seconds/120 seconds/300 seconds/600 seconds/1800 seconds), the bag containing the swollen super absorbent polymer was taken out from the water having an electrical conductivity of 110 μS/cm, and then was hung and left to stand for 1 minute. Thereafter, a weight $W_3$ of the envelope was measured.
3) In addition, the same operation was performed without using a super absorbent polymer, and a weight $W_2$ at that time was measured.
4) Using each weight obtained as described above, the free-swelling capacity $FSC_{110}$ (g/g) over time in water having an electrical conductivity value of 110 μS/cm was calculated according to Equation 1 below.

$$\text{Free-swelling capacity } FSC_{110} \text{ (g/g) in water having electrical conductivity value of 110 μS/cm}=\{[W_3(g)-W_2(g)-W_1(g)]/W_1(g)\} \quad \text{[Equation 1]}$$

The measurement results of the free-swelling capacity $FSC_{110}$ (g/g) over time in water having an electrical conductivity of 110 μS/cm of Examples and Comparative Examples are shown in Table 1 below.

TABLE 1

| | Free-swelling capacity $FSC_{110}$ (g/g) over time in water having electrical conductivity of 110 μS/cm Swelling time, t (s) | | | | | | | |
|---|---|---|---|---|---|---|---|---|
| | 10 | 20 | 30 | 60 | 120 | 300 | 600 | 1800 |
| Example 1 | 54 | 85 | 121 | 188 | 261 | 339 | 359 | 384 |
| Example 2 | 53 | 84 | 107 | 171 | 249 | 336 | 363 | 388 |
| Example 3 | 30 | 50 | 82 | 192 | 303 | 319 | 319 | 328 |
| Example 4 | 40 | 59 | 94 | 168 | 245 | 320 | 354 | 371 |
| Example 5 | 52 | 87 | 132 | 182 | 252 | 325 | 334 | 338 |
| Comparative Example 1 | 28 | 50 | 73 | 136 | 203 | 287 | 310 | 307 |
| Comparative Example 2 | 16 | 29 | 47 | 104 | 168 | 284 | 346 | 376 |
| Comparative Example 3 | 33 | 49 | 70 | 106 | 182 | 268 | 314 | 371 |
| Comparative Example 4 | 35 | 56 | 79 | 117 | 187 | 264 | 306 | 336 |

(2) Calculation of $S_e$ value and $S_e$/r Value in Water Having Electrical Conductivity of 110 μS/Cm Using Voigt Model Equation The free-swelling capacity $FSC_{110}$ (g/g) value of water having an electrical conductivity of 100 μS/cm to 130 μS/cm over time(s) in Table 1 was set as $S_t$, and modeled using the equation of Equation 1.

Specifically, the raw data on the fitting curve was fitted using the Origin program, and then a graph curve value was extracted to obtain an $S_e$ value and an r value.

The $S_e$ value and the r value derived above were used to calculate an $S_e$/r value, and the results are shown in Table 2 below.

Figure 4:
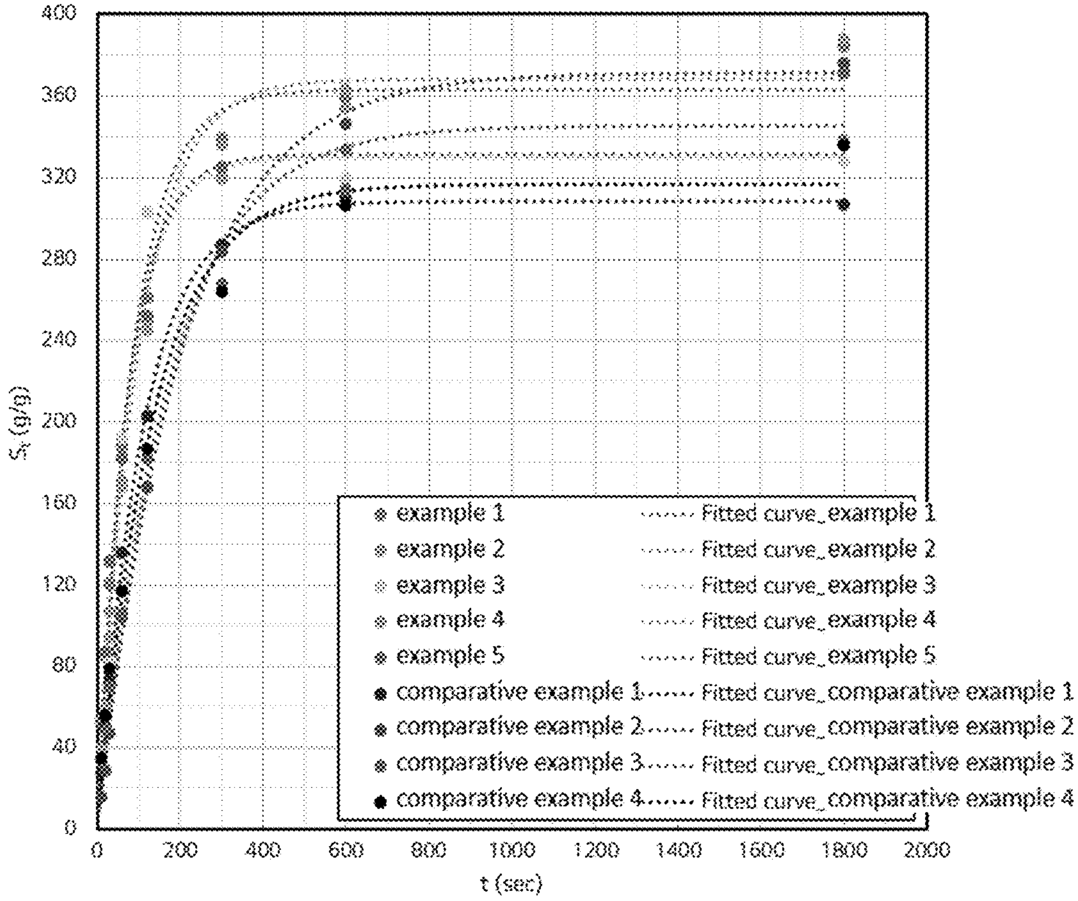
FIG. 4 is a graph integrating the graphs of FIG. 2 and FIG. 3.

FIGS. 2 and 3 are graphs obtained by modeling the absorption behavior over time in water having an electrical conductivity of 110 μS/cm according to Equation 1 with respect to the super absorbent polymer of each of Examples and Comparative Examples, and FIG. 4 is a graph integrating the graphs of FIG. 2 and FIG. 3.

TABLE 2

| | Fitted curve | | | |
|---|---|---|---|---|
| Sample | $S_e$ (g/g) | r (s) | $S_e$/r (g/g/s) | R2 |
| Example 1 | 363 | 84 | 4.32 | 0.988 |
| Example 2 | 368 | 97 | 3.79 | 0.987 |
| Example 3 | 330 | 74 | 4.46 | 0.967 |
| Example 4 | 356 | 102 | 3.51 | 0.994 |
| Example 5 | 331 | 72 | 4.62 | 0.989 |
| Comparative Example 1 | 308 | 109 | 2.83 | 0.999 |
| Comparative Example 2 | 371 | 203 | 1.83 | 0.998 |
| Comparative Example 3 | 345 | 171 | 2.02 | 0.980 |
| Comparative Example 4 | 317 | 133 | 2.38 | 0.984 |

(3) Centrifuge Retention Capacity (CRC, g/g)

The centrifuge retention capacity of the super absorbent polymer of each of Examples and Comparative Examples by absorption rate under no load was measured in accordance with the European Disposables and Nonwovens Association (EDANA) standard EDANA WSP 241.3.

As described in the EDANA WSP 241.0, the measurement was performed at a temperature of 23±2° C. and a relative humidity of 45±15%.

Specifically, a super absorbent polymer $W_4$ (g) (about 0.2 g) obtained through each of Examples and Comparative Examples was uniformly placed in a nonwoven fabric bag and sealed, and then immersed in physiological saline (0.9 wt %) at room temperature. After 30 minutes, the bag was drained for 3 minutes under the condition of 250 G using a centrifugal separator, and a weight $W_6$ (g) of the bag was measured. In addition, the same operation was performed without using a polymer, and then a weight $W_5$(g) at that time was measured.

CRC (g/g) was calculated according to Equation 2 below using each obtained weight.

$$CRC\,(g/g) = \{[W_6(g) - W_5(g)]/W_4(g)\} - 1 \qquad \text{[Equation 2]}$$

(4) Absorbency Under Pressure (AUP, g/g)

The absorbency of 2.07 kPa (0.3 psi) of the super absorbent polymer of each of Examples and Comparative Examples was measured according to the method of EDANA WSP 242.3.

As described in the EDANA WSP 242.0, the measurement was performed at a temperature of 23±2° C. and a relative humidity of 45±15%.

Specifically, a 400-mesh wire made of stainless steel was mounted on the bottom of a plastic cylinder having an inner diameter of 25 mm. Under the conditions of room temperature and a humidity of 50%, a super absorbent polymer $W_7$(g) (0.9 g) was evenly sprayed on the wire mesh, and a piston capable of more evenly applying a load of 2.07 kPa (0.3 psi) on the top thereof and being slightly smaller than the outer diameter of 25 mm was allowed to have no gap with the inner wall of the cylinder, and the upward and downward movement of the piston was not disturbed. At this time, a weight $W_8$(g) of the above-described device was measured.

A glass filter having a diameter of 90 mm and a thickness of 5 mm was placed on the inside of a petri dish having a diameter of 150 mm, and physiological saline composed of 0.9 wt % sodium chloride was set to the same level as the upper surface of the glass filter. One sheet of filter paper having a diameter of 90 mm was placed thereon. The measurement device was placed on the filter paper, and a liquid was absorbed under a load for 1 hour. After 1 hour, the measurement device was lifted, and a weight $W_9$ (g) thereof was measured.

Absorbency under pressure (g/g) was calculated according to Equation 3 below using each obtained weight.

$$AUP(g/g) = [W_9(g) - W_8(g)]/W_7(g) \qquad \text{[Equation 3]}$$

(5) Vortex Time

The vortex time of the super absorbent polymer of each of Examples and Comparative Examples was measured by the following method.

① First, 50 mL of 0.9% salt water was added to a 100 mL beaker having a flat bottom using a 100 mL mass cylinder.

② Next, the beaker was placed in the center of a magnetic stirrer, and a circular magnetic bar (diameter 30 mm) was placed inside the beaker.

③ Thereafter, the stirrer was operated such that the magnetic bar was stirred at 600 rpm, and the lowest portion of a vortex generated by the stirring was brought into contact with the top of the magnetic bar.

④ After confirming that the temperature of the salt water in the beaker reached 24.0° C., 2±0.01 g of a super absorbent polymer sample was introduced thereinto and simultaneously, a stop watch was operated, and the time until the vortex disappeared and the surface of the liquid became completely horizontal was measured in seconds, which was set to vortex time.

TABLE 3

| | CRC (g/g) | AUP (g/g) | Vortex time (sec) |
|---|---|---|---|
| Example 1 | 37.6 | 32.1 | 19 |
| Example 2 | 37.7 | 32.3 | 26 |
| Example 3 | 35.2 | 33.5 | 28 |
| Example 4 | 37.1 | 32.5 | 27 |
| Example 5 | 36.0 | 32.2 | 27 |
| Comparative Example 1 | 32.5 | 28.4 | 27 |
| Comparative Example 2 | 38.8 | 25.6 | 39 |
| Comparative Example 3 | 40.6 | 22.2 | 43 |
| Comparative Example 4 | 37.5 | 27.1 | 41 |

As can be confirmed in Table 3 above, it has been confirmed that in the case of the present disclosure, the initial absorption speed ($S_e/r$) calculated through the Voigt model equation with respect to water having an electrical conductivity of 100 μS/cm to 130 μS/cm is controlled to a predetermined level or above, thereby improving absorption speed while simultaneously improving absorption performance such as centrifuge retention capacity and absorbency under pressure to exhibit an excellent physical property balance.

A super absorbent polymer according to the present disclosure exhibits excellent absorption behavior with respect to water having a low ion concentration and a low electrical conductivity, so that when the corresponding polymer is applied to an actual product, the polymer may implement excellent quality.

Particularly, it is possible to provide a super absorbent polymer having an excellent physical property balance by improving the initial absorption speed while simultaneously improving absorption performance such as centrifuge retention capacity and absorbency under pressure.

In addition, when the above-described super absorbent polymer is applied to a hygiene product such as a diaper, the super absorbent polymer can absorb discharged body fluids at a high speed, and also in a relatively large amount, and thus, may prevent a problem such as accumulation of body fluids inside the hygiene product or leakage thereof to the outside.

That is, it is possible to provide a super absorbent polymer capable of quickly absorb body fluids when applied to a product and retaining a large amount of body fluids without leaking the same to the outside.

Although the super absorbent polymer has been described with reference to the specific aspects, it (they) is (are) not limited thereto. Therefore, it will be readily understood by those skilled in the art that various modifications and changes can be made thereto without departing from the spirit and scope of the present disclosure defined by the appended claims.

What is claimed is:

1. A super absorbent polymer, which is a polyacrylic acid (salt)-based super absorbent polymer, wherein the super absorbent polymer is in the form of particles having micropores of 100 μm or less, wherein the super absorbent polymer has an absorbency under pressure (AUP) of 30 g/g or more as measured under 2.07 kPa (0.3 psi) according to the method of EDANA WSP 242.3, and wherein the super absorbent polymer has a $S_e/r$ value of 3.0 g/g/sec or more according to Equation 1 below:

$$S_t = S_e \times \left(1 - e^{-t/r}\right) \quad \text{[Equation 1]}$$

wherein in Equation 1 above, t represents swelling time(s), $S_t$ represents the free-swelling capacity (g/g) of the super absorbent polymer in water having an electrical conductivity of 100 μS/cm to 130 μS/cm at the swelling time(s) t, and $S_e$ and r are constants, and wherein the $S_e$ value is 310 g/g or more and the r value is 102 seconds or less.

2. The super absorbent polymer of claim 1, wherein the super absorbent polymer has a centrifuge retention capacity (CRC) of 35 g/g or more as measured according to the method of EDANA WSP 241.3.

3. The super absorbent polymer of claim 1, wherein the super absorbent polymer has vortex time measured by a vortex measurement method at 24.0° C. of 30 seconds or less.

4. The super absorbent polymer of claim 1, wherein the super absorbent polymer has a centrifuge retention capacity (CRC) of 35 g/g or more as measured according to the method of EDANA WSP 241.3, and wherein the super absorbent polymer has vortex time measured by a vortex measurement method at 24.0° C. of 30 seconds or less.

5. The super absorbent polymer of claim 1, wherein the $S_e/r$ value is 3.7 g/g/sec or more.

6. The super absorbent polymer of claim 1, wherein the $S_e$ value is 330 g/g or more.

7. The super absorbent polymer of claim 1, wherein the super absorbent polymer has a centrifuge retention capacity (CRC) of 33 g/g or more as measured according to the method of EDANA WSP 241.3.

8. The super absorbent polymer of claim 1, wherein the super absorbent polymer has vortex time measured by a vortex measurement method at 24.0° C. of 40 seconds or less.

9. The super absorbent polymer of claim 1, wherein the super absorbent polymer has a free-swelling capacity (St) of 80 g/g or more at 30 seconds in water having an electrical conductivity of 110 μS/cm.

10. The super absorbent polymer of claim 1, wherein the polyacrylic acid (salt)-based super absorbent polymer comprises base polymer powder including a water-soluble ethylene-based unsaturated monomer having an acid group and a cross-linked polymer of an internal cross-linking agent.

11. The super absorbent polymer of claim 10, wherein the polyacrylic acid (salt)-based super absorbent polymer comprises a surface cross-linked layer formed on the base polymer powder by additionally cross-linking the cross-linked polymer by a surface cross-linking agent.

* * * * *